United States Patent
Galindo et al.

(10) Patent No.: US 9,140,161 B2
(45) Date of Patent: Sep. 22, 2015

(54) BI-FUEL ENGINE WITH VARIABLE AIR FUEL RATIO

(75) Inventors: Jose Ignacio Galindo, Reñaca (CL); Klaus M. Schaffer, Kirchfidisch (AT); Daniel Leitner, St. Stefan i. G. (AT); Christof Hepp, Dornbirn (AT)

(73) Assignee: ALSET IP S A R.L., Luxembourg (LU)

( * ) Notice: Subject to any disclaimer, the term of this patent is extended or adjusted under 35 U.S.C. 154(b) by 1344 days.

(21) Appl. No.: 12/795,410

(22) Filed: Jun. 7, 2010

(65) Prior Publication Data

US 2011/0301826 A1     Dec. 8, 2011

(51) Int. Cl.
*F02B 1/00* (2006.01)
*F02B 13/00* (2006.01)
(Continued)

(52) U.S. Cl.
CPC ............ *F01N 3/0814* (2013.01); *F02D 19/066* (2013.01); *F02D 19/0644* (2013.01); *F02D 19/081* (2013.01); *F02D 41/0025* (2013.01); (Continued)

(58) Field of Classification Search
CPC ......... Y02T 10/47; Y02T 10/36; Y02T 10/44; Y02T 10/40; F02D 19/081; F02D 41/0025; F02D 19/0644; F02D 41/0027; F02D 19/084; F02D 19/0647
USPC ............ 60/274, 286; 123/1 A, 575, 576, 577; 701/103, 104
See application file for complete search history.

(56) References Cited

U.S. PATENT DOCUMENTS 6,907,870 B2    6/2005   zur Loye
6,941,901 B2    9/2005   Taxon
(Continued)

FOREIGN PATENT DOCUMENTS

DE    10 2008 032 105 A1    3/2009
EP        1 243 776 A1    9/2009
(Continued)

OTHER PUBLICATIONS

International Search Report and Written Opinion of the International Searching Authority, mailed on May 11, 2011 for Alset 1000 application.

(Continued)

*Primary Examiner* — Mahmoud Gimie
*Assistant Examiner* — Sizo Vilakazi
(74) *Attorney, Agent, or Firm* — Paul J. Sutton; Barry G. Magidoff

(57) ABSTRACT

A conventional gasoline engine is retrofitted to operate as a bi-fuel engine using Hydrogen gas as a primary fuel and gasoline as a secondary fuel at various acceptable air fuel ratios while avoiding forbidden air fuel ratios. The engine is preferably operated to burn Hydrogen fuel in a charged mode and lean mode at certain acceptable air fuel ratios where relatively little $NO_x$ emissions occur. When additional power or acceleration is requested, processor controlled fuel injectors are operated to inject relatively small amounts of gasoline into the engine resulting in a fuel mixture that prevents increases in $NO_x$ emissions as the processor operates at a stoichiometric air fuel ratio where a catalytic converter is best able to reduce harmful emissions. The injection of the liquid gasoline fuel to the gaseous Hydrogen fuel reduces the temperature of the fuels significantly and reduces or eliminates backfiring tendency of the engine.

60 Claims, 8 Drawing Sheets

(51) Int. Cl.
  *F01N 3/08* (2006.01)
  *F02D 19/06* (2006.01)
  *F02D 19/08* (2006.01)
  *F02D 41/00* (2006.01)
  *F02D 41/30* (2006.01)
  *F02M 21/02* (2006.01)
(52) U.S. Cl.
  CPC ....... *F02D 41/3011* (2013.01); *F02M 21/0293* (2013.01); *Y02T 10/32* (2013.01); *Y02T 10/36* (2013.01); *Y10T 29/49233* (2015.01)

(56) References Cited

U.S. PATENT DOCUMENTS

| | | | |
|---|---|---|---|
| 7,109,626 B2 | 9/2006 | McClelland | |
| 7,290,504 B2 * | 11/2007 | Lange | 123/1 A |
| 7,631,713 B2 | 12/2009 | Kawasumi | |
| 7,740,010 B2 | 6/2010 | Fulton | |
| 7,822,530 B2 | 10/2010 | Shinagawa | |
| 2002/0185086 A1 * | 12/2002 | Newman et al. | 123/1 A |
| 2009/0071452 A1 | 3/2009 | Phlips | |
| 2009/0071453 A1 * | 3/2009 | Stockhausen et al. | 123/577 |
| 2010/0012090 A1 | 1/2010 | Lewis, III | |
| 2011/0297115 A1 * | 12/2011 | Galindo et al. | 123/1 A |
| 2011/0301826 A1 * | 12/2011 | Galindo et al. | 701/103 |

FOREIGN PATENT DOCUMENTS

| | | |
|---|---|---|
| EP | 1 745 201 B1 | 6/2010 |
| WO | WO 01/86128 A2 | 11/2001 |
| WO | WO 03/042521 A2 | 5/2003 |
| WO | WO 2004/101980 A1 | 11/2004 |
| WO | WO 2007/019649 A1 | 2/2007 |

OTHER PUBLICATIONS

Translation of Abstract of DE 10 2008 obtained from Espacenet website.

U.S. Appl. No. 12/795,440, filed Jun. 7, 2010, Jose Ignacio Galindo.

* cited by examiner

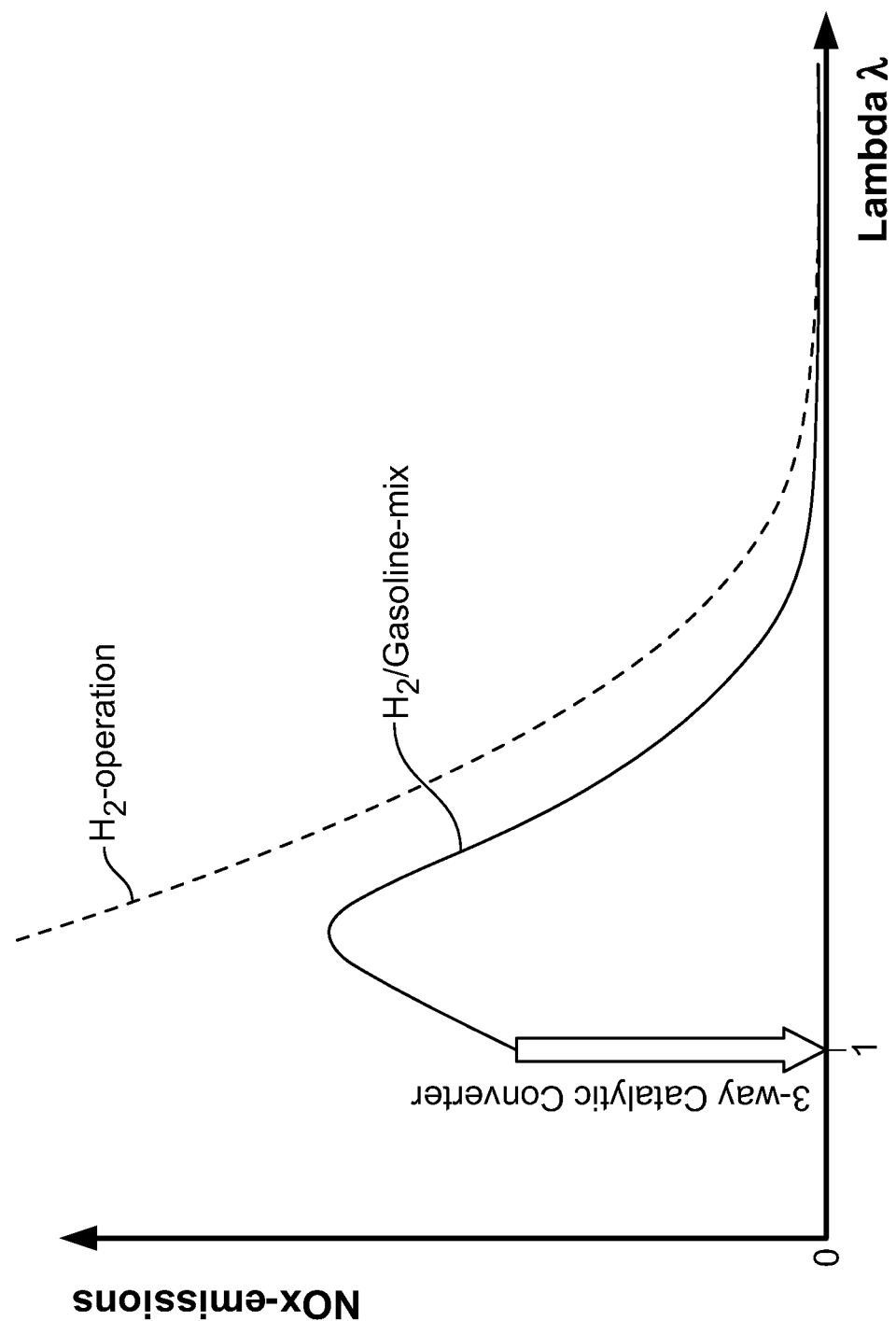

BI-FUEL ENGINE WITH VARIABLE AIR FUEL RATIO

This application is being filed on Jun. 7, 2010 concurrently with a commonly owned and related application entitled "Bi-Fuel Engine with Increased Power."

BACKGROUND OF THE INVENTION

1. Field of the Invention

The present invention generally relates to the design and control of internal combustion engines operating on two different fuels and capable of different modes of operations with different air fuel ratios.

2. Description of the Related Art

Internal combustion engines operate on the principle of igniting a mixture of air and gasoline (or other fuel) inside a cylinder to cause combustion within the cylinder where resulting released energy is converted to mechanical energy through the use of a piston inside the cylinder driving a crankshaft. Internal combustion engines are typically naturally aspirated meaning that air is drawn into the engine at atmospheric pressure. As a result of the combustion of the air fuel mixture within a cylinder of the engine, different types of unwanted toxic and pollutant gases are generated in the cylinder and pass through an exhaust system to a device commonly referred to as a catalytic converter.

The catalytic converter contains certain materials and catalysts to cause a chemical reaction to occur between said materials and the toxic, pollutant exhaust gases converting these harmful gases into less harmful emissions. Some of the harmful gases include carbon monoxide (CO), Hydrocarbons or volatile organic compounds, and Nitrogen oxides (referred to as $NO_x$ emissions). For efficient use of the catalytic converter, it is desirable that the air fuel mixture be maintained at the stoichiometric air fuel ratio of the fuel, which is used. That is, for exhaust gases resulting from a stoichiometric air fuel ratio, catalytic converters are best designed to convert these types of harmful exhaust gases into less harmful emissions. For an ideal combustion the amount of air and fuel used for combustion in a chamber of an engine is such that there is no residual oxygen or fuel remaining in the chamber after combustion, the particular air fuel ratio is referred to as the stoichiometric air fuel ratio. The stoichiometric air fuel ratio depends on the type of fuel used; for example, for gasoline the stoichiometric air fuel ratio is 14.7 lbs of air to 1 lb. of gasoline. The actual air fuel ratio of an engine is often expressed in terms of the stoichiometric air fuel ratio and the symbol $\lambda$ (lambda) is typically used to denote the ratio between the actual ratio and the stoichiometric ratio. The mathematical expression for $\lambda$ is thus:

$$\lambda = \frac{\left(\frac{\text{mass of air}}{\text{mass of fuel}}\right)_{\text{actual}}}{\left(\frac{\text{mass of air}}{\text{mass of fuel}}\right)_{\text{stoichiometric}}} \quad (1)$$

Based on the definition of $\lambda$ above, internal combustion engines are ideally designed to operate at a $\lambda=1$ meaning that the air fuel ratio in an engine cylinder is maintained at the stoichiometric ratio or relatively close to the stoichiometric ratio to achieve the most reduction of harmful gases by a catalytic converter.

Referring to FIG. 1, there is shown a graph of $\lambda$ as a function of time for a typical internal combustion gasoline engine. The upper boundary 102 of value 103 and lower boundary 104 of value 0.97 for a desirable value 108 of $\lambda=1+/-0.03$ are shown. The $\lambda$ curve 106 is shown to be within the boundary values during operation of the engine. In many circumstances, the $\lambda$ curve is outside of the boundaries resulting in relatively higher emissions of harmful gases into the environment because the catalytic converter cannot reduce these emissions as efficiently as the emissions resulting from a $\lambda=1+/-0.03$. When an engine is operated with a $\lambda>1$, the engine is said to be operated in a lean mode. When $\lambda<1$, the engine is said to be operated in a rich mode.

BRIEF SUMMARY OF THE INVENTION

The present invention provides a device, system and method for controlling a bi-fuel internal combustion engine. The device comprises a processor and an air pump both coupled to the engine and to each other whereby the processor is able to control the air pump and fuel intake of the engine. The air pump, fuel intake of the engine and engine parameters are controlled by the processor to meet power requirements of the engine, achieve acceptable air fuel ratios and avoid forbidden air fuel ratios during operation of the engine. The air fuel ratios are described in terms of $\lambda$.

Acceptable $\lambda$ values are those values that are desirable based on one or more defined conditions. For example, when the defined condition is the amount of harmful or undesired exhaust gases generated from the combustion of the primary fuel and air or the combustion of a mix of the primary fuel and secondary fuel and air, or the combustion of the secondary fuel and air, acceptable values are those values in which $\lambda=1$ because the resulting harmful gases can be best reduced by a catalytic converter at that $\lambda$ value. Further, acceptable values are those values where the combustion of the primary fuel and air (or mixture of primary and secondary fuel and air, or a mix of the secondary fuel and air) for $\lambda$ values other than 1 does not produce any appreciable amounts of harmful gases or undesired gases. The amount of harmful or undesired gases considered to be appreciable can be arbitrarily set for different applications and/or implementations of the claimed invention.

Conversely, forbidden $\lambda$ values are those values that are not desirable (or not acceptable) based on one or more defined conditions. For example, when the defined condition is the amount of harmful or undesired exhaust gases generated by the combustion of the primary fuel and air, primary fuel, or secondary fuel and air mix, any $\lambda$ value which produces a definable amount (i.e., amounts equal to or beyond an arbitrary threshold) of harmful or undesired gases is forbidden.

The engine can operate with either a primary fuel or a secondary fuel or a mixture of both fuels. When the engine is operating with a mixture of the primary and secondary fuels, the processor calculates values of the engine parameters including proper amounts of secondary and primary fuels to inject into the engine to meet the power requirements of the engine. The term "proper amount" may represent a quantity of fuel, or a quantity of fuel mixture, or a quantity of air or any combination of these quantities to enable the occurrence of a desired engine operation, mode or result. The fuel intake can be processor controllable components and/or assemblies (e.g., processor controllable fuel injectors) designed to inject the primary and/or secondary fuels into the engine. For example, the fuel intake may comprise fuel injectors for injecting the primary fuel and fuel injectors for injecting the secondary fuel into the engine.

When the engine uses the primary fuel it preferably operates in a lean mode. When acceleration or engine power increase is requested while the engine is using the primary fuel, the processor calculates a first set of engine parameters values which includes the proper amount of primary fuel to be drawn or injected into the engine, the proper amount of air to be drawn or pumped into the engine, and thus the resulting air fuel ratio corresponding to $\lambda_A$ to achieve the power requested. The processor also calculates a second set of engine parameter values which includes the proper amounts of the secondary fuel and the primary fuel, the proper amount of air to be drawn or pumped into the engine and thus the resulting air fuel ratio corresponding to $\lambda_B$ to achieve the power requested. The processor further calculates a third set of engine parameter values which includes the proper amounts of secondary and primary fuels ultimately mixed together in a cylinder of the engine, and the proper amount of air to be drawn or pumped into the engine for an air fuel ratio corresponding to $\lambda=1$ to achieve the power requested. It should be noted that the proper amounts of primary fuel and secondary fuel can be mixed together either prior to entering the engine cylinder (e.g., at the intake manifold) or inside the engine cylinder.

The device, system and method of the present invention use the third set of engine parameter values to operate the engine if both air fuel ratios from the first and second set of engine parameter values are forbidden. Otherwise, the device, system and method of the present invention select the set of engine parameter values from either the first or second set that provides an acceptable air fuel ratio. When both $\lambda_A$ and $\lambda_B$ are acceptable, the method of the present invention selects the leaner $\lambda$, i.e., the $\lambda$ having the higher value.

When the engine uses a fuel mixture comprising the primary and secondary fuels, the processor controls the fuel intake and air into the engine to preferably operate the engine in lean mode. The processor may use the second set of engine parameter values and the corresponding air fuel ratio to achieve the power requested. Also, the processor may use the third set of engine parameter values to operate the engine at $\lambda=1$. If operation using the second set of parameter values and corresponding air fuel ratio (i.e., the corresponding $\lambda$) is forbidden, the device, system and method of the present invention uses the third set of engine parameter values to control the engine at an air fuel ratio corresponding to $\lambda=1$.

The first, second and third set of engine parameter values each includes a respective backup set of engine parameter values calculated by the processor to operate the engine using the secondary fuel with an air fuel ratio corresponding to $\lambda=1$ (or with an acceptable lean $\lambda$) to achieve the power requested; this operation occurs when the primary fuel is not available. Some examples of the unavailability of the primary fuel include when the system shuts off the primary fuel source due to a dangerous condition (e.g., primary fuel leakage) or when the primary fuel has been exhausted. Thus, the secondary fuel acts as a backup fuel when the primary fuel is not available. The backup sets of engine parameter values are pre-calculated to allow a switch in operation to secondary fuel operation when the primary fuel becomes unavailable. Further, the method, device and system of the present invention may switch to secondary fuel operation using the backup engine parameter values when a user of the invention intentionally switches to secondary fuel operation and shuts off the primary fuel source or the primary fuel is unavailable. The method, device and system of the present invention is thus designed to automatically switch engine operation—when the primary fuel becomes unavailable—to an air fuel ratio corresponding to $\lambda=1$ (or an acceptable lean $\lambda$) using the secondary fuel and the backup engine parameter values at any time during engine operation where only the primary fuel was being used or when a mixture of the primary and secondary fuel was being used. Also, the switch to secondary fuel using the backup engine parameter values can be intentionally done at any time during engine operation by a user of the system. During this operation the user may shut off the source of the primary fuel in which case, the backup engine parameter values are used to operate the engine. If the primary fuel is available then operation with the secondary fuel is as follows.

When the engine uses the secondary fuel, the processor controls the fuel intake and air intake to preferably operate the engine in lean mode. The processor calculates a set of engine parameter values for an air fuel ratio corresponding to a $\lambda$ for lean operation, which meets the power requirements of the engine. The processor calculates another set of engine parameter values corresponding to $\lambda=1$; these sets of engine parameter values are not necessarily equal to the set of parameters corresponding to the backup set of parameter values when the primary fuel is unavailable. In case the set of parameter values for lean operation results in a forbidden $\lambda$, the processor uses the set of parameter values corresponding to $\lambda=1$ to operate the engine.

During operation of the engine, the air pump, which can be implemented as a turbocharger, is activated so as to pump air into the engine at increased pressure with the throttle held at a wide open position for lean values of $\lambda$ i.e., for $\lambda\gg1$; operating the engine with the throttle in a wide open position is referred to as quality control. 'Wide open' refers to the opening of the throttle to a position so that it does not restrict the airflow into the engine for appropriate values of $\lambda$ (the air being pumped into the engine by the turbocharger or supercharger or air pump). A wide-open position will vary for different types of engines depending on throttle design and engine speed. When using quality control an increase in engine output power is achieved by injecting additional fuel into the engine. For $\lambda=1$ operation, quantity control is used meaning the engine is throttled. That is, when using quantity control the engine throttle position is varied to achieve engine output power requirements. Therefore, when operation of the engine switches from a lean $\lambda$ to a $\lambda=1$ operation, at the same time, the engine control switches from quality control to quantity control as explained above.

It should be noted that the present invention can also apply to a naturally aspirated bi-fuel engine. That is, during operation of the engine, the throttle is held at a wide open position for lean values of $\lambda$, i.e., for $\lambda\gg1$; operating the engine with the throttle in a wide open position as described above is referred to as quality control. As described above when using quality control an increase in engine output power is achieved by injecting additional fuel into the engine. For $\lambda=1$ operation, quantity control is used meaning the engine is throttled. That is, when using quantity control the engine throttle position is varied to achieve engine output power requirements. Therefore, when operation of the engine switches from a lean $\lambda$ to a $\lambda=1$ operation, at the same time, the naturally aspirated bi-fuel engine control switches from quality control to quantity control. For mix fuel operation where proper amounts of a primary fuel and secondary fuel are injected into the naturally aspirated engine, the processor calculates and/or determines engine parameters values to meet power requirements of the naturally aspirated engine.

In one embodiment, the primary fuel is Hydrogen gas and the secondary fuel is gasoline. In this embodiment the air pump may be implemented with a turbo charger driven by the exhaust gases of the engine. When operating with the primary fuel of Hydrogen, the processor uses either the first or third set of engine parameter values. That is, for the desired power, if the first set of engine parameter values cannot provide the desired power at an acceptable air fuel ratio, then operation using a mixture of hydrogen gas and gasoline is used and such operation is achievable at the air fuel ratio corresponding to a λ equal to 1.

In this embodiment and in other embodiments that use a gaseous primary fuel and a liquid secondary fuel, the addition of the liquid secondary fuel tends to significantly reduce backfiring tendency as the addition of a liquid secondary fuel results in the reduction of the temperature of the resulting fuel mixture and of the intake system. This temperature reduction is due to the evaporation of the liquid secondary fuel, a process that reduces the temperature of the air fuel mixture. Also, when the secondary liquid fuel is added to the primary fuel, the primary fuel mass is reduced by a corresponding proper amount (i.e., amount of primary fuel equal in energy to energy of secondary fuel added) to maintain the total energy density of the fuel mixture thus resulting in a lean primary fuel operation that reduces the backfiring tendency. Further, the addition of a secondary fuel that inherently has less backfiring tendency than the primary fuel will also reduce the backfiring tendency of the engine operating with that fuel mixture.

BRIEF DESCRIPTION OF THE DRAWINGS

FIG. 3B shows a graph of $NO_x$ emissions as a function of λ;

DETAILED DESCRIPTION

Figure 1:
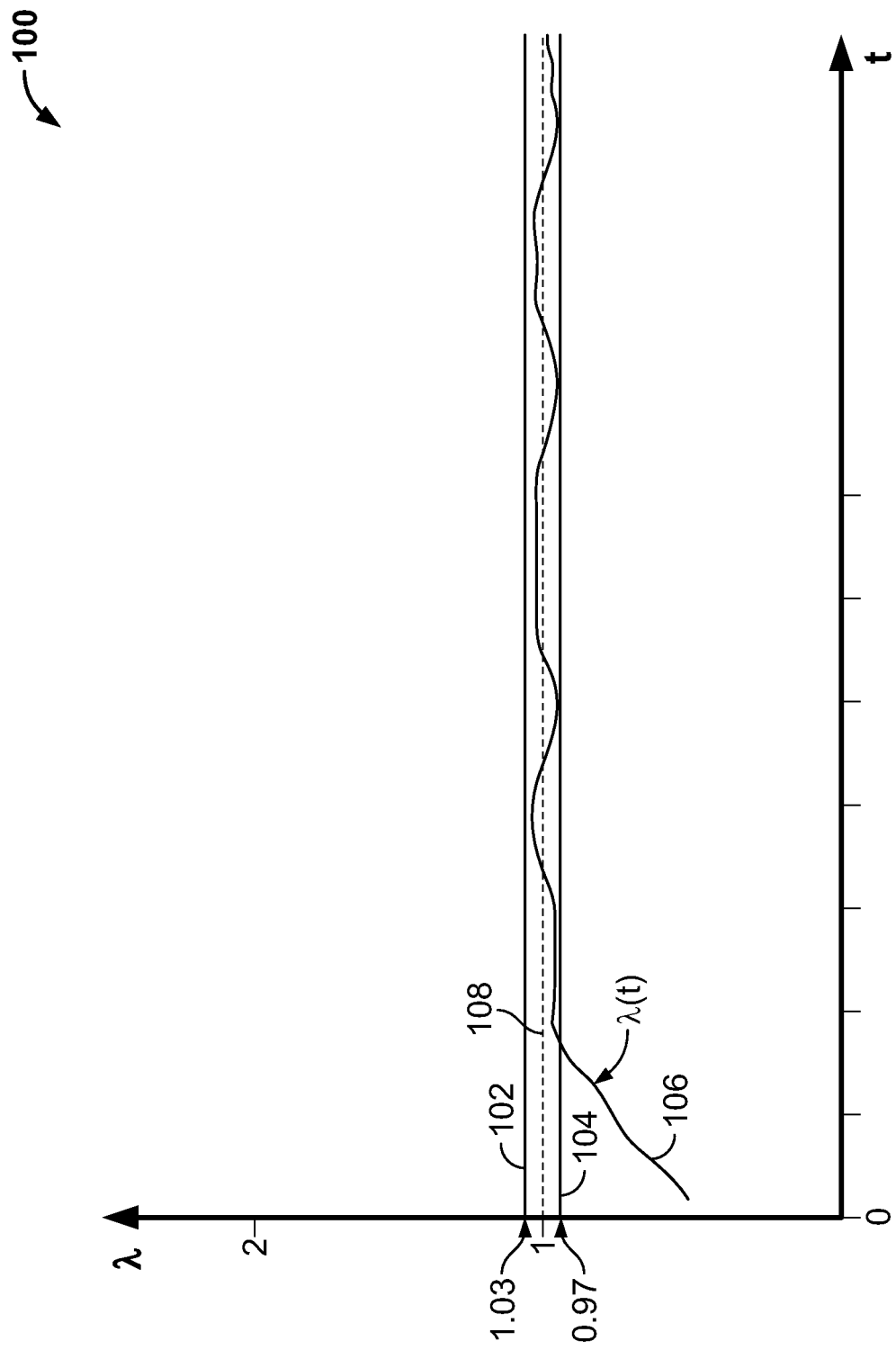
FIG. 1 shows a graph of air fuel ratio value λ for a conventional gasoline engine.

The present invention provides a device, system and method for controlling a bi-fuel internal combustion engine. The device comprises a processor and an air pump both coupled to the engine and to each other whereby the processor is able to control the air pump and fuel intake of the engine. The air pump, fuel intake of the engine and engine parameters are controlled by the processor to meet power requirements of the engine, achieve acceptable air fuel ratios and avoid forbidden air fuel ratios during operation of the engine. The air fuel ratios are described in terms of λ.

Acceptable λ values are those values that are desirable based on one or more defined conditions. For example, when the defined condition is the amount of harmful or undesired exhaust gases generated from the combustion of the primary fuel and air or the combustion of a mix of the primary fuel and secondary fuel and air, or the combustion of the secondary fuel and air, acceptable values are those values in which λ=1 because the resulting harmful gases can be best reduced by a catalytic converter at that λ value. Further, acceptable values are those values where the combustion of the primary fuel and air (or mixture of primary and secondary fuel and air, or a mix of the secondary fuel and air) for λ values other than 1 does not produce any appreciable amounts of harmful gases or undesired gases. The amount of harmful or undesired gases considered to be appreciable can be arbitrarily set for different applications and/or implementations of the claimed invention.

Conversely, forbidden λ values are those values that are not desirable (or not acceptable) based on one or more defined conditions. For example, when the defined condition is the amount of harmful or undesired exhaust gases generated by the combustion of the primary fuel and air, primary fuel, secondary fuel and air mix, or secondary fuel and air mix, any λ value which produces a definable amount (i.e., amounts equal to or beyond an arbitrary threshold) of harmful or undesired gases is forbidden.

The engine can operate with either a primary fuel or a secondary fuel or a mixture of both fuels. When the engine is operating with a mixture of the primary and secondary fuels, the processor calculates values of the engine parameters including proper amounts of secondary and primary fuels to inject into the engine to meet the power requirements of the engine. The term "proper amount" may represent a quantity of fuel, or a quantity of fuel mixture, or a quantity of air or any combination of these quantities to enable the occurrence of a desired engine operation, mode or result. The fuel intake can be processor controllable components and/or assemblies (e.g., processor controllable fuel injectors) designed to inject the primary and/or secondary fuels into the engine. For example, the fuel intake may comprise fuel injectors for injecting the primary fuel and fuel injectors for injecting the secondary fuel into the engine.

When the engine uses the primary fuel it preferably operates in a lean mode. When acceleration or engine power increase is requested while the engine is using the primary fuel, the processor calculates a first set of engine parameters values which includes the proper amount of primary fuel to be drawn or injected into the engine, the proper amount of air to be drawn or pumped into the engine, and thus the resulting air fuel ratio corresponding to $\lambda_A$ to achieve the power requested. The processor also calculates a second set of engine parameter values which includes the proper amounts of the secondary fuel and the primary fuel, the proper amount of air to be drawn or pumped into the engine and thus the resulting air fuel ratio corresponding to $\lambda_B$ to achieve the power requested. The processor further calculates a third set of engine parameter values which includes the proper amounts of secondary and primary fuels ultimately mixed together in a cylinder of the engine, and the proper amount of air to be drawn or pumped into the engine for an air fuel ratio corresponding to λ=1 to achieve the power requested. It should be noted that the proper amounts of primary fuel and secondary fuel can be mixed together either prior to entering the engine cylinder (e.g., at the intake manifold) or inside the engine cylinder.

The device, system and method of the present invention use the third set of engine parameter values to operate the engine if both air fuel ratios from the first and second set of engine parameter values are forbidden. Otherwise, the device, system and method of the present invention select the set of engine parameter values from either the first or second set that provides an acceptable air fuel ratio. When both $\lambda_A$ and $\lambda_B$ are acceptable, the method of the present invention selects the leaner λ, i.e., the λ having the higher value.

When the engine uses a fuel mixture comprising the primary and secondary fuels, the processor controls the fuel intake and air into the engine to preferably operate the engine in lean mode. The processor may use the second set of engine parameter values and the corresponding air fuel ratio to achieve the power requested. Also, the processor may use the third set of engine parameter values to operate the engine at λ=1. If operation using the second set of parameter values and corresponding air fuel ratio (i.e., the corresponding $\lambda$) is forbidden, the device, system and method of the present invention uses the third set of engine parameter values to control the engine at an air fuel ratio corresponding to $\lambda=1$.

The first, second and third set of engine parameter values each includes a respective backup set of engine parameter values calculated by the processor to operate the engine using the secondary fuel with an air fuel ratio corresponding to $\lambda=1$ (or with an acceptable lean $\lambda$) to achieve the power requested; this operation occurs when the primary fuel is not available. Some examples of the unavailability of the primary fuel include when the system shuts off the primary fuel source due to a dangerous condition (e.g., primary fuel leakage) or when the primary fuel has been exhausted. Thus, the secondary fuel acts as a backup fuel when the primary fuel is not available. The backup sets of engine parameter values are pre-calculated to allow a switch in operation to secondary fuel operation when the primary fuel becomes unavailable. Further, the method, device and system of the present invention may switch to secondary fuel operation using the backup engine parameter values when a user of the invention intentionally switches to secondary fuel operation and shuts off the primary fuel source or the primary fuel is unavailable. The method, device and system of the present invention is thus designed to automatically switch engine operation—when the primary fuel becomes unavailable—to an air fuel ratio corresponding to $\lambda=1$ (or an acceptable lean $\lambda$) using the secondary fuel and the backup engine parameter values at any time during engine operation where only the primary fuel was being used or when a mixture of the primary and secondary fuel was being used. Also, the switch to secondary fuel using the backup engine parameter values can be intentionally done at any time during engine operation by a user of the system. During this operation the user may shut off the source of the primary fuel in which case, the backup engine parameter values are used to operate the engine. If the primary fuel is available then operation with the secondary fuel is as follows.

When the engine uses the secondary fuel, the processor controls the fuel intake and air intake to preferably operate the engine in lean mode. The processor calculates a set of engine parameter values for an air fuel ratio corresponding to a $\lambda$ for lean operation, which meets the power requirements of the engine. The processor calculates another set of engine parameter values corresponding to $\lambda=1$; these sets of engine parameter values are not necessarily equal to the set of parameters corresponding to the backup set of parameter values when the primary fuel is unavailable. In case the set of parameter values for lean operation results in a forbidden $\lambda$ the processor uses the set of parameter values corresponding to $\lambda=1$ to operate the engine.

During operation of the engine, the air pump, which can be implemented as a turbocharger, is activated so as to pump air into the engine at increased pressure with the throttle held at a wide open position for lean values of $\lambda$, i.e., for $\lambda \gg 1$; operating the engine with the throttle in a wide open position is referred to as quality control. 'Wide open' refers to the opening of the throttle to a position so that it does not restrict the airflow into the engine for appropriate values of $\lambda$ (the air being pumped into the engine by the turbocharger or supercharger or air pump). A wide open position will vary for different types of engines depending on throttle design and engine speed. When using quality control an increase in engine output power is achieved by injecting additional fuel into the engine. For $\lambda=1$ operation, quantity control is used meaning the engine is throttled. That is, when using quantity control the engine throttle position is varied to achieve engine output power requirements. Therefore, when operation of the engine switches from a lean $\lambda$ to a $\lambda=1$ operation, at the same time, the engine control switches from quality control to quantity control as explained above.

It should be noted that the present invention can also apply to a naturally aspirated bi-fuel engine. That is, during operation of the engine, the throttle is held at a wide open position for lean values of $\lambda$ i.e., for $\lambda \gg 1$; operating the engine with the throttle in a wide open position as described above is referred to as quality control. As described above when using quality control an increase in engine output power is achieved by injecting additional fuel into the engine. For $\lambda=1$ operation, quantity control is used meaning the engine is throttled. That is, when using quantity control the engine throttle position is varied to achieve engine output power requirements. Therefore, when operation of the engine switches from a lean $\lambda$ to a $\lambda=1$ operation, at the same time, the naturally aspirated bi-fuel engine control switches from quality control to quantity control. For mix fuel operation where proper amounts of a primary fuel and secondary fuel are injected into the naturally aspirated engine, the processor calculates and/or determines engine parameters values to meet power requirements of the naturally aspirated engine.

In one embodiment, the primary fuel is Hydrogen gas and the secondary fuel is gasoline. In this embodiment the air pump may be implemented with a turbo charger driven by the exhaust gases of the engine. When operating with the primary fuel of Hydrogen, the processor uses either the first or third set of engine parameter values. That is, for the desired power, if the first set of engine parameter values cannot provide the desired power at an acceptable air fuel ratio, then operation using a mixture of hydrogen gas and gasoline is used and such operation is achievable at the air fuel ratio corresponding to a $\lambda$ equal to 1.

In this embodiment and in other embodiments that use a gaseous primary fuel and a liquid secondary fuel, the addition of the liquid secondary fuel tends to significantly reduce backfiring tendency as the addition of a liquid secondary fuel results in the reduction of the temperature of the resulting fuel mixture and of the intake system. This temperature reduction is due to the evaporation of the liquid secondary fuel, a process that reduces the temperature of the air fuel mixture. The mixture of gasoline and hydrogen requires a relatively higher ignition energy than hydrogen only. Also, when the secondary liquid fuel is added to the primary fuel, the primary fuel mass is reduced by a corresponding proper amount (i.e., amount of primary fuel equal in energy to energy of secondary fuel added) to maintain the total energy density of the fuel mixture thus resulting in a lean primary fuel operation that reduces the backfiring tendency. Further, the addition of a secondary fuel that inherently has less backfiring tendency than the primary fuel will also reduce the backfiring tendency of the engine operating with that fuel mixture.

It should be noted that the device, system and method of the present invention apply to engines referred to as Otto cycle engines which include gasoline internal combustion engines as well as Diesel internal combustion engines converted to operate with gasoline or Compressed Natural Gas (CNG). It is well known that Diesel engines can be converted to Otto cycle engines such as (1) internal combustion engines that run on CNG or (2) internal combustion engines that run on gasoline.

Figure 2:
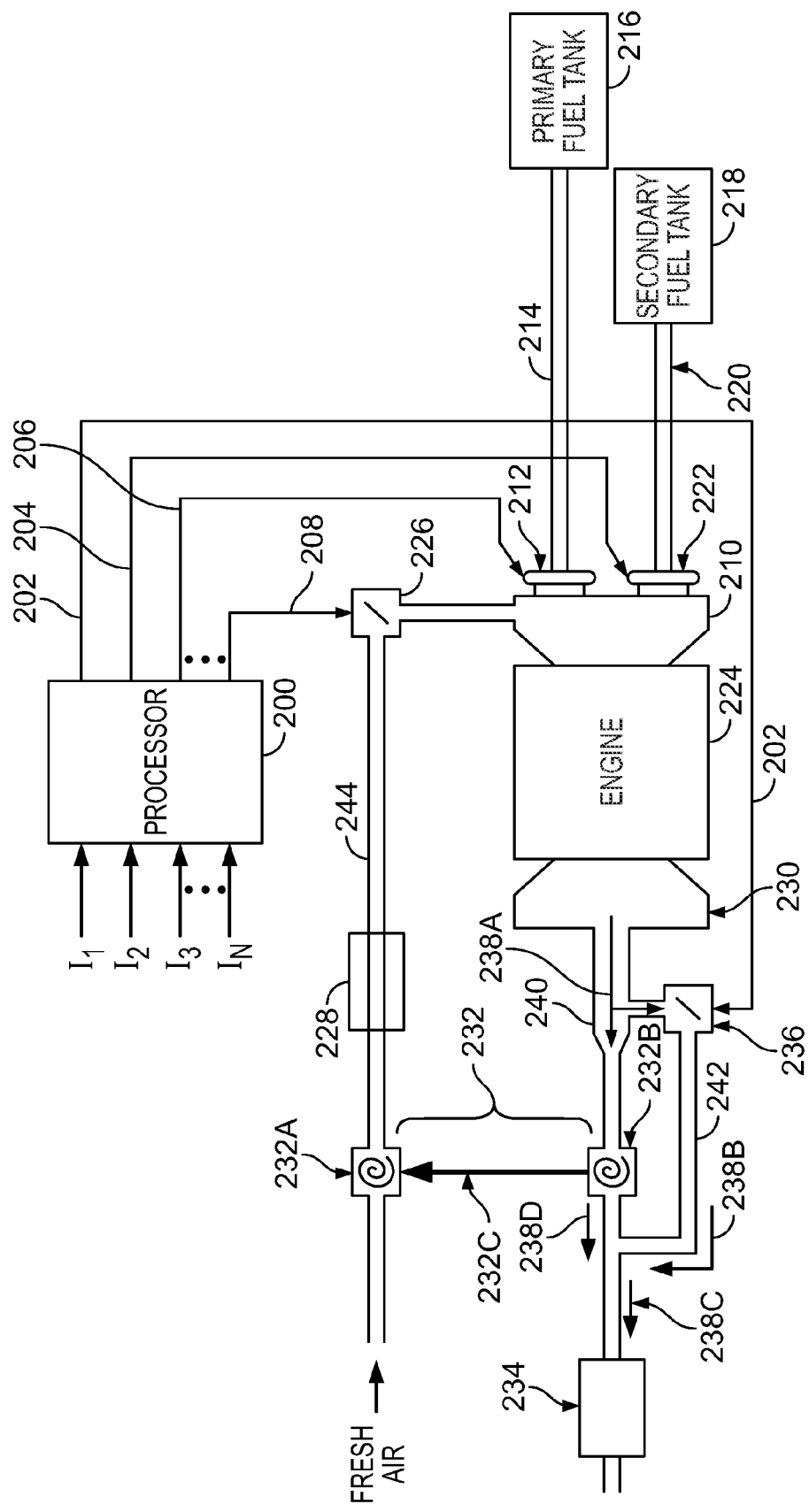
FIG. 2 shows one embodiment of the device and system of the present invention.

The present invention will be described in the context of a bi-fuel engine operating on Hydrogen gas as a primary fuel and gasoline as a secondary fuel. For the sake of explanation, the device of the present invention will be described using a conventional naturally aspirated vehicle gasoline engine 224 retrofitted as shown in FIG. 2 and described herein and calibrated to burn Hydrogen gas using a turbocharger or a supercharger or some well known type of air pump. Calibration of the engine to run on Hydrogen (or any other type of primary fuel) involves determining, calculating and setting the engine parameters to certain values to enable such operation. Retrofitting an engine refers to the modification and/or adjustment of a naturally aspirated engine, a turbocharged engine or a supercharged engine with the various components of the device of the present invention to operate in accordance with the method of the present invention.

One manner in which an engine can be retrofitted is to use components from a cross platform kit comprising various components such as a housing, a processor stored in the housing, a processor controlled air pump (e.g., turbocharger, supercharger), a processor controlled throttle and a processor controlled fuel intake assembly (e.g., predrilled intake manifold and fuel injectors for the primary and secondary fuels). That is, the device of the present invention is prepared or packaged as a cross platform kit. The predrilled holes of the intake manifold have the proper diameters for installation of primary and secondary fuel injectors which are also part of the kit. For example, an engine being retrofitted to become a bi-fuel engine that operates with Hydrogen as the primary fuel and gasoline as the secondary fuel may be fitted with a pre-drilled intake manifold where the predrilled holes of the intake manifold are openings through which the fuel injectors can be mounted. Also, the primary and/or secondary fuel injectors may be installed or positioned on or proximate the engine so that they inject their respective fuels directly into the engine cylinder or chamber; this technique is called direct injection. The kit may further comprise an electric accelerator pedal that can be coupled to the processor 200 to allow the processor to determine the pedal position at a particular instant in time. The term 'cross platform' refers to the ability to use the same or similar kit to retrofit different types of internal combustion engines. For variations in engine size and design, certain components of the kit may be modified, but the basic set of components of a cross platform kit remains virtually the same from engine to engine. For example, the intake manifold may be smaller or bigger or a different shape for different engines, but the basic component of an intake manifold is constant for all kits. Alternate versions of the cross platform kit may not have a processor; instead, software having instructions to operate the engine as per the method of the present invention can be downloaded onto the ECU of the engine being retrofitted. The downloaded software can complement the existing software in the ECU to properly operate the engine. The cross platform kit is thus a grouping of components which when properly installed on a conventional (naturally aspirated, turbocharged or supercharged) engine to retrofit the engine allows the engine to operate as a bi-fuel engine where at least one of the fuels can be a non-carbon based fuel (e.g., Hydrogen).

It will be readily understood, however, that engines originally designed specifically to operate in accordance with the method, device and system of the present invention can also be used and thus the present invention is not limited to retrofitted engines. That is, the present invention can be implemented with an engine originally designed and manufactured to operate in accordance with the method, device and system of the present invention. It will also be readily understood that the method, device and system of the present invention are not limited to the particular retrofitted conventional gasoline engine shown in FIG. 2; the particular engine in FIG. 2 is used for ease of explanation. When operating an internal combustion engine with Hydrogen, (i.e., Hydrogen gas, $H_2$) the device, method and system of the present invention allow for more power at lower engine speed (i.e., more low end torque) and reduced nitrogen oxides emissions at lower engine speeds. The terms Hydrogen and Hydrogen gas will hereinafter be used interchangeably to indicate the various states of Hydrogen which can be used in this claimed invention.

The Hydrogen or Hydrogen gas is preferably stored in a specially designed tank 216 compressed at a relatively high pressure (for example, 200 bars or higher). The Hydrogen can also be stored in liquid form or as bound hydrogen using tanks made with specialized materials (such as alkali metals) to which the Hydrogen molecules are bound or the Hydrogen gas can be stored in any other manner that allows the device, method and system of the present invention to have access to the primary fuel when needed for engine operation. The gasoline tank 218 is a conventional gas tank that is used to store gasoline. As will be described herein, the primary fuel is the fuel which is mainly used to operate the engine and proper amounts of the primary and the secondary fuels are injected at appropriate times to provide more power to the engine when needed. Also, the secondary fuel can be injected to operate the engine as a backup fuel when the primary fuel is not available due to, for example, safety reasons (e.g., primary fuel shut off due to detection of primary fuel leaks) or due to exhaustion of the primary fuel (i.e., primary fuel tank is empty). During operation with the primary fuel or with a mix of the primary and secondary fuels, there are relatively small amounts of noxious gas emissions; this is because the engine is operated in a lean mode as described herein or at a stoichiometric air fuel ratio where harmful emissions are greatly reduced by a catalytic converter. For mix fuel operation when one of the fuels is gasoline, then $\lambda=1$ operation mode is to be used as will be discussed herein Referring to FIG. 2 there is shown one embodiment of the device and system of the present invention in which a primary fuel of Hydrogen gas and a secondary fuel of gasoline are used. Processor 200 may be a microprocessor, a microcontroller, a signal processor, a microcomputer or any combinations thereof. Processor 200 has control lines 202, 204, 206 and 208 to control actuators such as waste gate 236, gasoline fuel injectors 222, Hydrogen gas fuel injectors 212 and engine throttle 226 respectively. Actuators are electrical, mechanical, electromechanical or other types of engine components all of which are controllable by the processor 200 (or processor 400 in FIG. 4 to be discussed infra) and some of which are part of the device of the present invention. Generally, the processor 200 may have N control lines where N is an integer equal to 1 or greater. The control lines carry signals from the processor 200 to the various actuators to control such devices in accordance with the present invention. The control lines may be implemented as electrical wires that carry electrical or electronic signals. The control lines may also be optical lines that carry optical signals or communication channels of a wireless communication system. Focusing temporarily on the intake side of the engine 224, tank 216 (or a Hydrogen storage system) contains Hydrogen gas providing Hydrogen to the engine via fuel line 214 and hydrogen fuel injectors 212. Gasoline fuel tank 218 provides gasoline to the engine via fuel line 220 and gasoline fuel injectors 222. The Hydrogen gas fuel injectors 212 and gasoline fuel injectors 222 are mounted onto intake manifold 210 where they inject fuel to be used by the engine; the fuel injectors can also be mounted onto the engine so that they inject fuel directly into a combustion chamber of the engine (i.e., a cylinder)—this arrangement is commonly known as direct injection.

The device of the present invention as discussed infra may be prepared and/or packaged as a kit for installation onto an internal combustion engine. Some of the components of the kit comprise a housing having disposed therein processor 200 with various outputs that serve as control lines (e.g., 202-208 or generally N control lines) and various inputs lines ($I_1, \ldots, I_N$), where N is an integer equal to 1 or greater, connected to the different sensors and monitoring devices of the engine. For example, the input lines may carry signals from the sensors and/or monitoring devices such as a $\lambda$ sensor, an acceleration pedal position indicator, throttle position indicator, air mass flow sensor, $H_2$ sensor (or primary fuel sensor), engine speed monitor, engine temperature monitor, $H_2$ pressure sensor, Boost pressure sensor, vacuum pump sensor (monitors vacuum pump operation used in a vehicle's braking system) and ambient conditions sensor (e.g., temperature, pressure). These different sensors, monitoring devices and indicators measure engine parameters which are continually provided to processor 200. The engine parameters are variables of measurable engine characteristics of the sensors and/or monitoring devices which when analyzed reflect the status of an engine and its operation. The values of one or more engine parameters can be processed, manipulated and/or modified to control the operation of the engine. The measured values of these different sensors, monitors, and indicators are engine parameter values which can be used by the processor 200 to calculate the power requirement of the engine and other status of the engine. For example, engine parameter values such as accelerator pedal position, engine torque and/or engine speed can be used by processor 200 to determine whether more power is being requested by an operator of the engine. Thus, the processor 200 will act accordingly based on these engine parameter values. Hydrogen gas fuel injectors 212, which are also part of the kit, can be mounted onto the intake system 210 (e.g., intake manifold 210 with predrilled holes. An accelerator pedal capable of generating an electric or electronic signal indicating pedal position—i.e., an electric accelerator pedal can also be part of the kit. Additionally, a processor controllable throttle can also be part of the kit. The electrical or electronic signal from the accelerator pedal can then be received by processor 200 for operation of the engine. The mounting of the Hydrogen gas fuel injectors 212 may involve drilling openings onto the engine body (e.g., intake manifold 210) relatively near the existing gasoline fuel injectors 222 and then securing these Hydrogen fuel injectors 212 through these openings. Other methods for mounting the Hydrogen fuel injectors 212 can be used. For example, the Hydrogen fuel injectors (as well as the gasoline fuel injectors) can be mounted on or near the engine proximate the combustion chambers of the engine or positioned with respect to the combustion chambers so that fuel is injected directly into the combustion chambers; this is commonly referred to as direct injection. The fuel injectors deliver fuel to the intake manifold and then air fuel mixture is delivered to the combustion chamber through the inlet valves of the combustion chambers. The $H_2$ sensor or primary fuel sensor may act in concert with a primary fuel shut off valve (not shown) to automatically shut off the primary fuel when the sensor has detected a primary fuel leakage. The primary fuel then becomes unavailable. The primary fuel shut off valve may be positioned within or in line with the primary fuel line and is controllable by the processor 200 to automatically shut off the primary fuel upon receiving a signal from the primary fuel sensor (e.g., $H_2$ sensor) indicating a primary fuel leakage causing the processor to operate the engine in a backup mode using the secondary fuel. Further, an operator of the engine may actuate a switch (not shown) coupled to the processor 200 via one of its input lines to cause the shut off valve to shut off the primary fuel and cause the processor to operate the engine in a backup mode using the secondary fuel.

In other embodiments, it will be readily understood that the processor 200 may be integrated into an existing Engine Control Unit (ECU) of the vehicle or system; that is, additional instructions can be programmed into the ECU to perform the steps of the method, device and system of the present invention thus avoiding the use of an additional processor such as processor 200.

On the exhaust side of the engine 224, there is exhaust manifold 230 from which exhaust pipe 240 extends. The path of the exhaust gases are shown by arrows 238A, 238B, 238C and 238D. The exhaust gases flow through exhaust pipe 240 and a portion of these exhaust gases may be re-routed when waste gate 236 (e.g., a valve) is controlled by processor 200 via control line 202 to open allowing a portion of the exhaust gases to flow through bypass exhaust pipe 242. Waste gate 236 is positioned within or in line with exhaust pipe 242. When processor 200 causes waste gate 236 to close, no exhaust gas flows through bypass exhaust pipe 242. Instead, the exhaust gases flow through exhaust pipe 240 to engage turbocharger 232 comprising turbine 232B coupled to shaft 232C which drives compressor 232A. Thus, exhaust gases which are not re-routed through waste gate 236, flow through exhaust pipe 240 to engage turbine 232B (positioned within or in line with exhaust pipe 240) which is coupled to and engages shaft 232C which drives compressor 232A (positioned within or in line with air intake conduit 244) which serves to pump fresh air into air intake conduit (e.g., a pipe or tube) 244 to engine throttle 226. Thus, the control of the waste gate 236 determines the amount of fresh air delivered to the engine. Throttle 226 is controlled by processor 200 via control line 208. For the various embodiments discussed herein, the throttle may be processor controllable or processor controlled. The fresh air pumped by compressor 232A into air intake conduit 244 is first cooled with cooling device 228 (see, for example, Wikipedia.org/wiki/Intercooler) and then flows to throttle 226 for proper operation of the engine 224. Thus, the air pump is implemented using a turbo charger 232 coupled to throttle 226 via air conduit 244. Ultimately, the exhaust gases flow through the various pipes 240 and/or 242 to catalytic converter 234 as shown and the converter converts as much of the exhaust gases to non-harmful gases as is allowed by the air fuel ratio of the exhaust gases thus reducing the amount of harmful gases emitted into the environment.

During operation of the engine using the device, system and method of the present invention, care is taken to control the air fuel ratio of the engine to avoid or reduce emissions of harmful carbon gases and to avoid emissions of Nitrogen oxides (e.g., NO, $NO_x$). With Hydrogen gas as a primary fuel, the engine is controlled to operate in a lean mode. An internal combustion engine operating in a lean mode while burning Hydrogen gas produces harmful gases for certain ranges of air fuel ratios. For most other air fuel ratios, combustion of Hydrogen and air produces virtually no harmful gases and the by-product of such a combustion is typically water. As described previously, the air fuel ratio is typically expressed in terms of a stoichiometric air fuel ratio using the symbol $\lambda$. An engine burning fuel at the stoichiometric air fuel ratio has a $\lambda=1$. Equation (1) is reproduced below for ease of reference:

$$\lambda = \frac{\left(\frac{\text{mass of air}}{\text{mass of fuel}}\right)_{\text{actual}}}{\left(\frac{\text{mass of air}}{\text{mass of fuel}}\right)_{\text{stoichiometric}}}$$

In a lean mode of operation where $\lambda>1$, more air flows to the engine than for stoichiometric operation. The converse to the lean mode is the rich mode where $\lambda<1$. For gasoline engines, it is desirable to operate at a λ=1 because the harmful exhaust gases can be best reduced by a catalytic converter at λ=1; that is, current catalytic converters, which are typically positioned in the exhaust system nearby the engine, are designed to best reduce the harmful emissions resulting from air/fuel combustions at the stoichiometric air fuel ratio (i.e., λ=1) for the fuel being burned. Also, for gasoline engines, because there is increasing concern about the amount of harmful exhaust gases that are emitted by such engines, many governmental regulatory authorities require that such engines operate at λ=1 at all times.

The device, method and system of the present invention can control an engine running on a primary fuel and a secondary fuel to operate at acceptable λ values and avoid operation at forbidden λ values where at least one of the fuels may be a non-carbon based fuel. A non-carbon based fuel is matter that can be combusted in an internal combustion engine where none of the atomic or molecular components of the matter is Carbon. Acceptable λ values are those values that are desirable based on one or more defined conditions. For example, when the defined condition is the amount of harmful gases generated by the combustion of the primary fuel and air or the combustion of a mix of the primary fuel and secondary fuel and air, or the combustion of the secondary fuel and air, acceptable values are those values in which λ=1 because the resulting harmful gases can be best reduced by a catalytic converter at that λ value. Further, acceptable values are those values where the combustion of the primary fuel and air (or mixture of primary and secondary fuel and air, or a mix of the secondary fuel and air) for λ values other than 1 does not produce any appreciable amounts of harmful exhaust gases reasonably considered to be harmful to the environment. The amount of harmful gases considered to be harmful can be arbitrarily set for different applications and/or implementations of the claimed invention. Conversely, forbidden λ values are those values that are not desirable (or not acceptable) based on one or more defined conditions. For example, when the defined condition is the amount of harmful gases generated by the combustion of the primary fuel and air, primary fuel, or secondary fuel and air mix, any λ value which produces a definable amount (i.e., amounts equal to or beyond an arbitrary threshold) of harmful gases is forbidden. It should be well understood that for gasoline engines even for λ=1, harmful gases are produced by the combustion of air and gasoline. However, because catalytic converters can best reduce the emissions of harmful gases for λ=1, current conventional gasoline engines are operated at λ=1 most of the time.

Therefore, forbidden λ values are outside the limits of an efficient working range of a catalytic converter; such a working range is typically around the stoichiometric air fuel ratio (i.e., λ=1+/− a percentage). An efficient working range is a range of values for λ in which the catalytic converter is best able to reduce noxious and/or harmful emissions of exhaust gases resulting from the combustion of the fuels under which an engine is operating. Acceptable values for λ are inside the limits or within the efficient working range of the catalytic converter where said acceptable values may be lean values of λ; for these values of λ virtually no Nitrous Oxide emissions occur.

Figure 3:
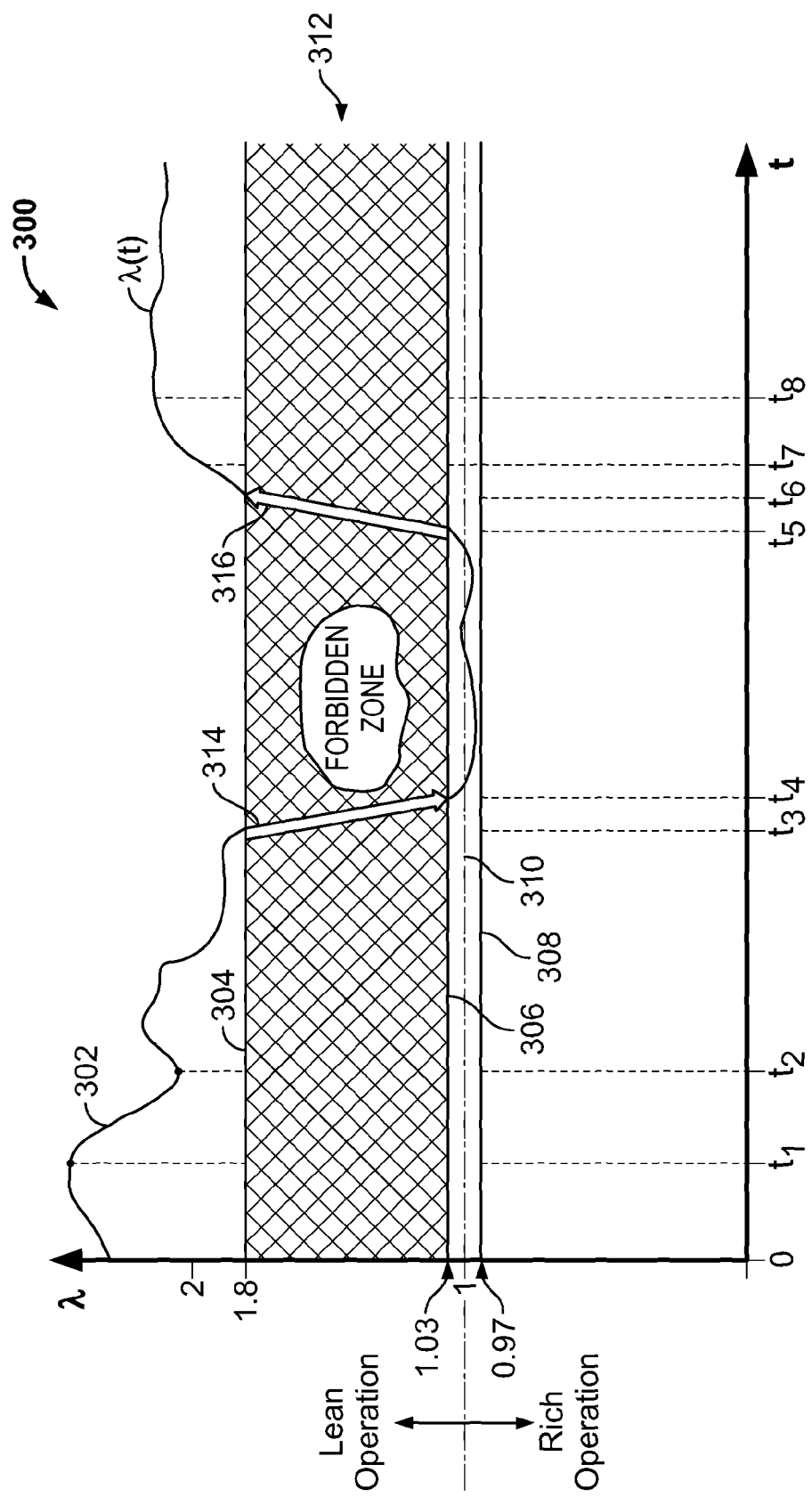
FIG. 3 shows operation of an engine designed in accordance with the present invention in terms of the air fuel ratio value λ.

Referring to FIG. 3, there is shown a graph 300 of λ as a function of time, i.e., λ(t), or curve 302, which shows an example of how λ can be controlled to operate an engine using Hydrogen gas as the primary fuel and gasoline as the secondary fuel. Graph 300 shows a region of forbidden λ values or forbidden zone 312 with lower boundary 306 having a λ value of 1.03 and an upper boundary 304 having a value of 1.8. The particular boundaries shown in FIG. 3 represent the operational boundaries for a specific type of engine and are shown for ease of explanation. It will be readily obvious that the boundaries of the forbidden zone may be different for different types of engines. For the particular engine being discussed (naturally aspirated gasoline engine, calibrated and retrofitted with the device, system and method of the present invention), stoichiometric operation, i.e., at λ=1, desirable value 310, the upper boundary 306 has a value of 1.03 and lower boundary 308 has a value of 0.97. For λ=1 operation, accuracy to within +/−0.03 is typically desired. When the engine is started using Hydrogen as the fuel, lean operation is desired and thus Hydrogen gas is injected and air is pumped into the engine to achieve lean operation; the engine is equipped with a λ sensor (not shown) which provides λ values to processor 200. One of the inputs, $I_N$, to the processor 200, where N is an integer equal to 1 or greater, can be values from the λ sensor. Alternatively, processor 200 can calculate the λ value by measuring the amount of air aspirated or pumped into each cylinder and the amount of Hydrogen gas it injects into the same cylinders and perform the calculation using equation (1) above. In lean mode operation, the engine is operated using quality control, i.e., throttle 226 is kept open in a wide open position and the engine power output is controlled by the amount of fuel (for this embodiment, Hydrogen) injected into the engine.

Processor 200 will continue to operate the engine in lean mode as shown. With Hydrogen as a primary fuel, operation at values of λ greater than 1.8 as shown results in negligible amounts of harmful emissions where most of the by-product of this operation is water. As more power is requested from the engine, processor 200 increases the amount of Hydrogen fuel injected into the cylinders of the engine decreasing λ accordingly; one example of more power being requested occurs between times $t_1$ and $t_2$ of graph 300. The request for more power is reflected in a change of one or more engine parameter values and such change is detected by processor 200. Between times $t_2$ and $t_3$, even more power is requested (e.g., acceleration pedal is being depressed with increasing pressure) and λ is decreased further. At some point, the amount of power requested from the engine will require λ values that fall within forbidden region 312.

The combustion of Hydrogen with air at λ values in the forbidden region results not only in the generation of appreciable amounts of harmful gases such as Nitrogen oxides, but could lead to unstable engine operation as pre-ignition and/or backfiring may occur. In general, the backfiring occurs while the inlet valve remains open and takes place in the intake manifold and/or combustion chamber. In order to reduce backfiring tendency, Hydrogen injection must be stopped before the inlet valve of the combustion chamber (i.e., inlet valve of an engine cylinder) closes. The injection of a liquid fuel such as gasoline along with or before the injection of Hydrogen gas and pumped air results in air fuel mixture in a cooled environment due to evaporation of the liquid fuel; the evaporation of the liquid fuel reduces the temperature of the air fuel mixture. That is, the resulting air fuel mixture in the intake manifold has a lower temperature than the temperature of Hydrogen gas and air mixture. Further, and more important, is that the addition of an amount of gasoline reduces the quantity of hydrogen in the fuel mixture by that equivalent amount which tends to reduce backfiring with the further advantage of increasing engine output power. The portions of the air fuel mixture (i.e., air, Hydrogen, gasoline) may be injected into the intake manifold virtually simultaneously. However, the full amount of each portion is not injected in one delivery but can be delivered to the intake manifold in measured amounts so as not to promote undesired combustion in the intake manifold. In this manner, the injection of the various components of the air fuel mixture does not result in combustion in the intake manifold regardless of the order of injection of the delivered amounts. Another approach for mix fuel operation that reduces backfiring tendency is the injection of gasoline (or a liquid fuel) and hydrogen (or gaseous fuel) in a way that gasoline (or a liquid fuel) enters into the combustion chamber before hydrogen (or the gaseous fuel). The injection of hydrogen (or gaseous fuel) must be calibrated in a way that the hydrogen-air mixture enters the combustion chamber before the inlet valve closes and therefore air is placed in front of the closed inlet valve. As a result, a significant reduction in the backfiring tendency is achieved. The mass of the primary fuel (e.g., Hydrogen) corresponding to a certain energy density is reduced to operate with a leaner primary fuel thus reducing the backfiring tendency. However, a proper amount of a liquid secondary fuel is added so that the total energy content of the fuel mixture remains constant. The addition of a secondary fuel (e.g., gasoline) that has a lesser tendency for backfiring will reduce the backfiring tendency of the fuel mixture. At time $t_3$, processor 200 will determine that entry into the forbidden region is imminent. At this point, the processor 200 switches the engine operation to $\lambda=1$ mode. In particular, the processor 200 controls the gasoline fuel injectors 222 to inject a proper amount of gasoline to the Hydrogen it is injecting from the control of Hydrogen fuel injectors 212 resulting in a fuel mix that has nearly the same amount of energy as the Hydrogen fuel injected at time $t_3$. Simultaneously, the processor 200 readjusts the throttle to reduce the amount of air drawn into the engine to achieve a value of 1 for $\lambda$. The switch over from operation in the lean mode to the fuel mix operation with $\lambda=1$ is done as fast as possible to avoid engine operation in the forbidden zone 312; arrow 314 shows the switch over occurring during a time period from times $t_3$ and $t_4$. The time period between times $t_3$ and $t_4$ should be as short as possible. At time $t_4$ the processor 200 has successfully controlled the air fuel ratio achieve a $\lambda$ of approximately 1.0 by injecting the proper amount of Hydrogen/gasoline mix and controlled the throttle 226 to pump the proper amount of air. The amount of air and the amount of fuel mix needed to achieve $\lambda=1$ operation is calculated by processor at preferably a time prior to time $t_3$ as a power requirement necessitating a switch over may occur at any time. For example, the calculation of air and fuel mix amounts can be done immediately after the engine is started and then the calculation can be periodically updated. In this manner, any sudden power requirement can be handled using these pre-calculated amounts. In general, during engine operation in the lean mode, calculations for $\lambda=1$ operation is done in anticipation of a sudden need (e.g., sudden increase power request) for such operation. Likewise, during $\lambda=1$ operation, calculations for lean mode operation are done in anticipation of a sudden switch to lean operation. It should be noted that a stoichiometric gasoline-air mixture has a higher volumetric energy density than a stoichiometric hydrogen air mixture considering external mixture formation. A mixture of Hydrogen gas and gasoline will serve to increase the power output of an engine running on Hydrogen gas only. That is, for a given unit volume of space, a liquid fuel occupying that space has a higher energy content per unit volume (i.e., higher volumetric energy density) than a gaseous fuel occupying a unit volume of space.

Alternatively, processor 200 may continuously inject defined unit quantities of gasoline while monitoring the $\lambda$ sensor output to maintain $\lambda=1+/-0.03$ operation. Other approaches for switching over to $\lambda=1$ operation may be used and thus the present invention is not limited to the two particular methods discussed herein. The method, device and system of the present invention are designed to switch over from lean operation to $\lambda=1$ operation thus avoiding engine operation in the forbidden region. During lean operation, the method of the present invention uses quality control which is the operation of the engine with the throttle in a wide open position. When using the quality control technique, the power of the engine is controlled by the amount of fuel injected into the engine. The engine is operated at $\lambda$ equaling to 1 from $t_4$ to $t_5$. During operation in the $\lambda=1$ mode, the engine is controlled using quantity control which is the operation of the throttle (varying position of throttle) to control the output power of the engine. While operating in the $\lambda=1$ mode, the present invention anticipating a return to lean mode of operation calculates the air fuel ratio and thus the $\lambda$ (and other parameter values) needed to return to lean operation because a reduced power requirement allowing for lean operation may occur at any time. At time $t_5$ the $\lambda$ for the power requirements is outside the forbidden region and thus the engine can be operated in lean mode again without having to inject gasoline as a fuel; quality control is thus used once again. Arrow 316 shows the switch from $\lambda=1$ operation to lean mode operation occurring between time $t_5$ and $t_6$. Processor 200 reduces and eventually eliminates the injection of gasoline and may even reduce or increase the amount of Hydrogen injected into the engine and controls the throttle resulting in increasing $\lambda$ values allowing the engine to switch to lean operation. From time $t_5$ to $t_8$, processor 200 continually decreases the amount of Hydrogen being injected into the engine causing $\lambda$ to increase accordingly. Thus, processor 200 is able to control the fuel intake and air intake of the engine to meet the requirements of the engine while avoiding forbidden air fuel ratios. It should be noted that the forbidden region shown in FIG. 3 is one example of a particular forbidden region for a particular vehicle gasoline engine retrofitted and calibrated to run on Hydrogen and gasoline. Other forbidden regions for other types of engines and for other types of applications may occur as required by the particular application. It should be noted that at any time during operation with the primary fuel or with a mixture of the primary and secondary fuels, the primary fuel may become unavailable (e.g., primary fuel shut off due to detection of primary fuel leak or primary fuel tank empty); in anticipation of such cases, backup parameter values are calculated for operation with the secondary fuel at a $\lambda=1$. If the secondary fuel is not gasoline and can burn without emitting harmful gases for various values of $\lambda$, then operation with values other than 1 for $\lambda$ is permitted. The processor can then switch to operation using the secondary fuel at $\lambda=1$ when it has been signaled by a fuel sensor that the primary fuel is not available. It should be further noted that the implementation of the method, device and system of the present invention is not limited to a retrofitted and calibrated engine. It will be readily obvious that the device, system and method of the present invention can be implemented with engines specifically designed for and built to operate in accordance with the present invention as described and/or claimed herein.

Figure 3A:
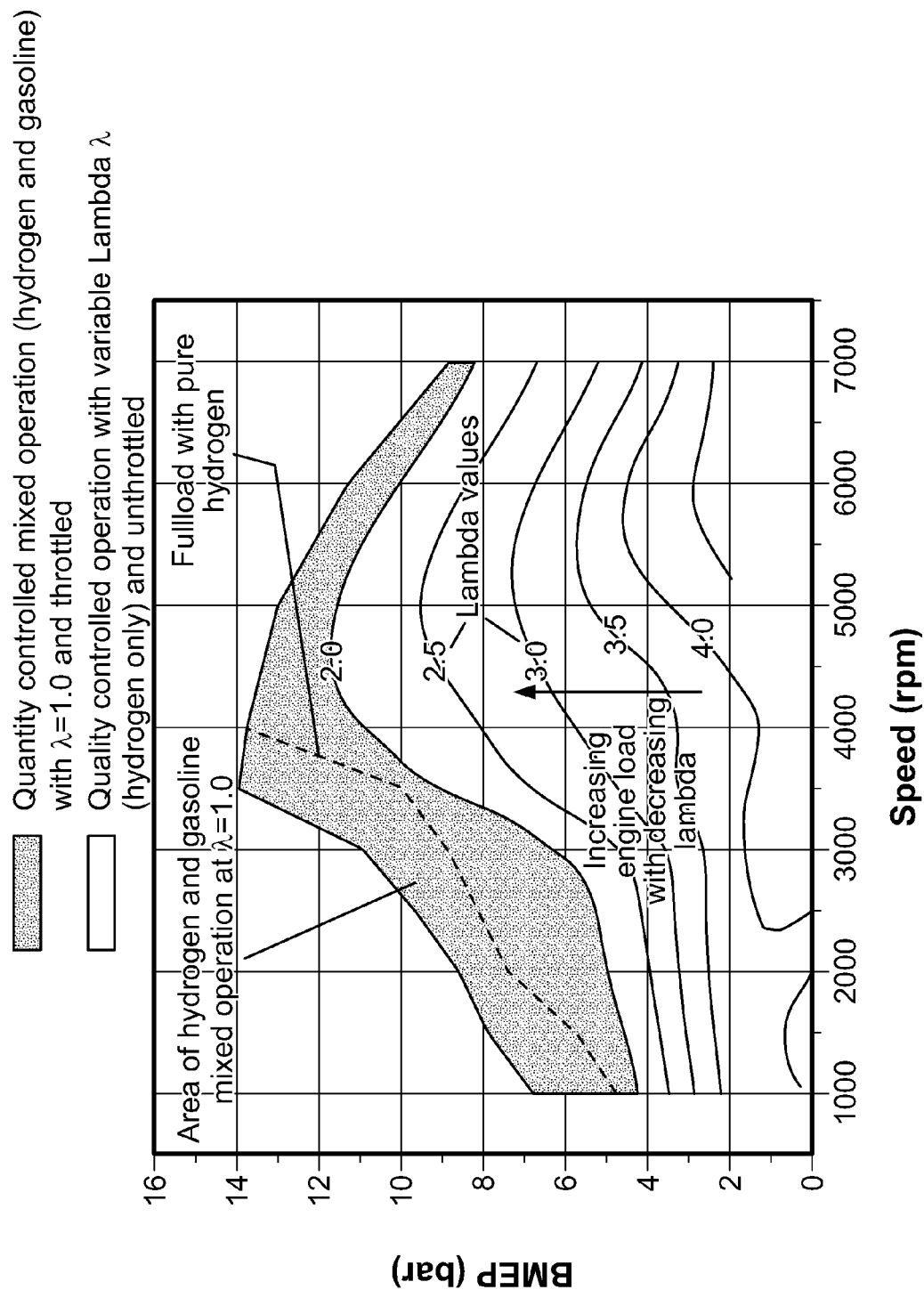
FIG. 3A shows a mapping for different values of λ as a function of engine speed and engine torque.

Referring now to FIG. 3A, there is shown a mapping of various values for $\lambda$ as a function of engine speed (measured in terms of revolutions per minute or rpm) and engine torque (measured in terms of BMEP (Brake Mean Effective Pressure)) for a gasoline engine calibrated and retrofitted to run on Hydrogen gas as a primary fuel and gasoline as a secondary fuel as shown in FIG. 2. The engine is operated using Hydrogen only for $\lambda>2.0$. When using Hydrogen only, the engine load is controlled by the amount of Hydrogen injected into the engine without throttling the pumped fresh air where the throttle is kept in a wide open position; as previously explained, this is referred to as quality control operation. If more torque is needed (e.g., acceleration pedal pressed) the present invention will inject more Hydrogen to achieve the required power. However, in increasing the amount of Hydrogen injected into the engine, if a forbidden region is reached, the present invention switches to $\lambda=1$ operation where an additional injection of gasoline and also throttling of the engine is done to control the engine load; the throttling of engine (i.e., varying the position of the throttle to control engine output power) is referred to as quantity control operation. Fuel mixture control (e.g., injecting gasoline in the Hydrogen fuel mixture) allows us to switch to $\lambda=1$ operation. In anticipation of switching from lean operation to $\lambda=1$ operation, the throttle position and other engine parameters are calculated prior to switching. Thus, injection of gasoline and changing the throttle position to the precalculated position are done simultaneously. In this manner engine operation is able to switch from lean operation to $\lambda=1$ operation. The present invention thus has the capability to switch to $\lambda=1$ operation from every and any operating point of the engine because the fuel mixture can be controlled as described herein. After reaching $\lambda=1$ operation the engine is operated using quantity control; that is, when more power is required, the throttle position will be changed accordingly to allow more air into the engine and the processor injects correspondingly more fuel to keep $\lambda=1$. For the example shown in FIG. 3A, for $\lambda=1$ operation, (see shaded region) up to 30% of the entire energy is due to the injected gasoline fuel and the remaining energy is from the Hydrogen fuel. The dashed line shown in the $\lambda=1$ operation represents the engine torque curve for Hydrogen only operation indicating that the volumetric energy density of Hydrogen gas is lower than the volumetric energy density of a mixture of Hydrogen and gasoline. With the use of Hydrogen only and a mixture of Hydrogen and gasoline, an engine retrofitted with the device of the present invention is able to operate at a relatively wide range of torque or engine output power. With Hydrogen only operation, the torque or output power produced by the engine are on the lower end of a torque/output power scale. With the addition of gasoline to the Hydrogen, mid-level torques or engine output power can be achieved. With gasoline only operation, the higher levels of the torque or output power can be achieved. When a turbocharger is used as described supra, the higher enthalpy of the exhaust gas for mix fuel operation (i.e., hydrogen and gasoline) engages the turbocharger as described supra providing higher boost pressure and thus creates more engine torque.

Referring to FIG. 3B, there is shown a graph of $NO_x$ emissions as a function of $\lambda$ for a gasoline engine retrofitted or originally designed to operate in accordance with the method, device and system of the present invention. The dashed line is a graph of $NO_x$ vs. $\lambda$ for Hydrogen fuel only. The graph in solid line is a graph of $NO_x$ vs. $\lambda$ for a Hydrogen/gasoline fuel mixture. As $\lambda$ approaches 1, the resulting $NO_x$ emissions from the primary fuel of Hydrogen gas increase appreciably. As shown, gasoline is added to the Hydrogen, the noxious fumes are reduced and at $\lambda=1$, the amount of $NO_x$ emissions into the environment is reduced significantly by the catalytic converter of the engine. The 3-way catalytic converter is a typical catalytic converter designed to reduce harmful Oxides of Nitrogen, unburned Hydrocarbons and Carbon monoxide.

Figure 4:
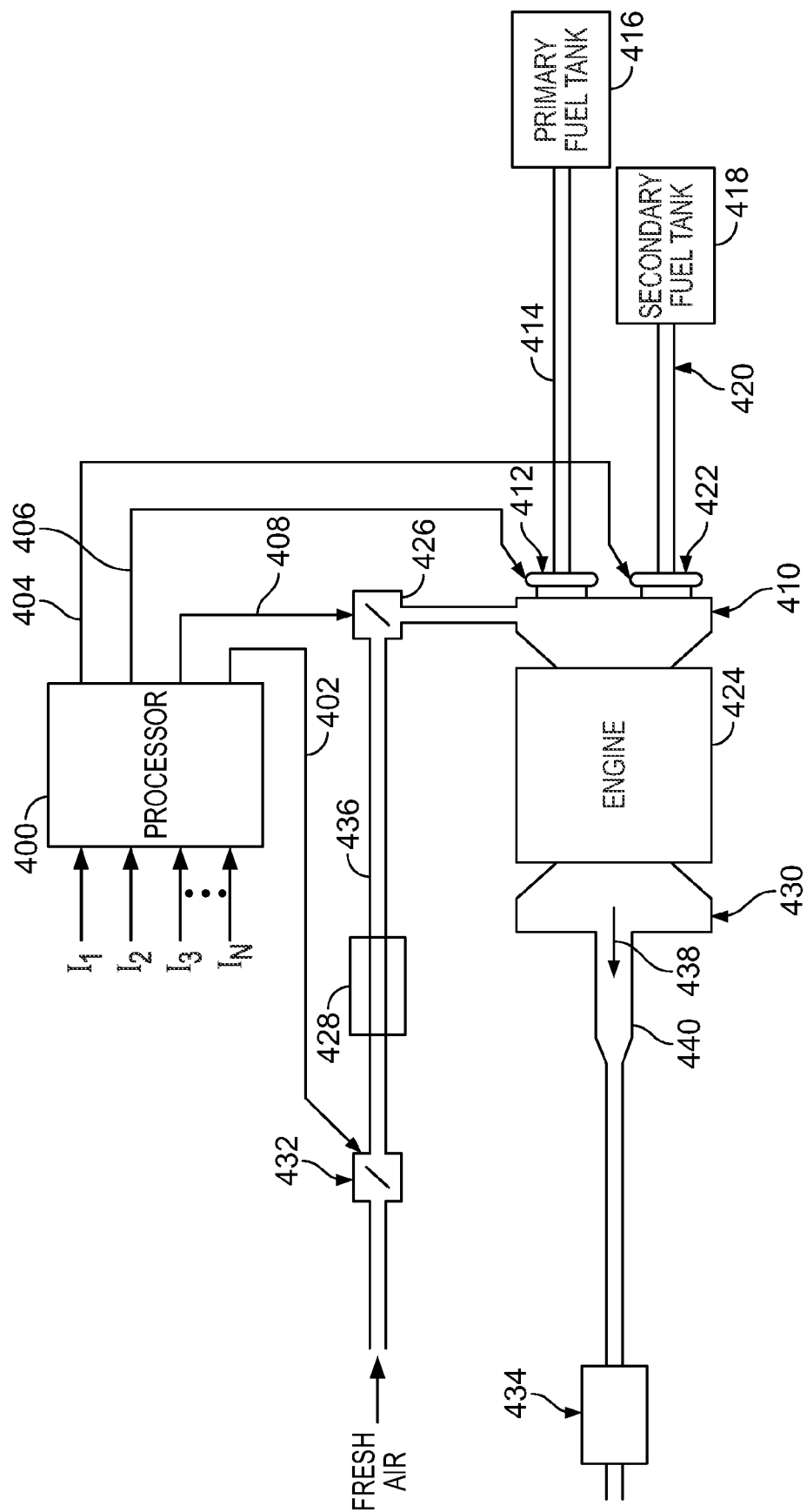
FIG. 4 shows another embodiment of the device and system of the present invention.

Referring now to FIG. 4, there is shown another embodiment of the device and system of the present invention in which a primary fuel of Hydrogen gas and a secondary fuel of gasoline are used. FIG. 2 is similar to FIG. 4 except that instead of a turbo charger, an air pump 432 (e.g., eaton.com/EatonCom/ProductsServices/PerformancesProducts/Products/Superchargers/index.ht m) controlled by processor 400 is used to pump fresh air into the engine 424. Another type of air pump known as a VTG-(Variable Turbine Geometry) turbocharger can also be used. It will be readily understood that air pump 432 represents any pump which can provide the necessary air (with the proper pressure) to the engine 424 operation in accordance with the present invention as described and/or claimed. For example, air pump 432 can be an electrically or electronically controlled pump. Processor 400 has control lines 402, 404, 406 and 408 to control actuators such as air pump 432, gasoline fuel injectors 422, Hydrogen fuel injectors 412 and engine throttle 426 respectively. Generally, the processor 400 may have N control lines where N is an integer equal to 1 or greater. The control lines carry signals from the processor 400 to the various actuators to control such devices in accordance with the present invention. The control lines may be implemented as electrical wires that carry electrical or electronic signals; the control lines may be optical lines or communication channels of a wireless communication system. Focusing temporarily on the intake side of the engine 424, tank 416 contains Hydrogen fuel providing Hydrogen to the engine via fuel line 414 and hydrogen fuel injectors 412. Fuel tank 418 contains gasoline providing gasoline to the engine via fuel line 420 and gasoline fuel injectors 422. The Hydrogen fuel injectors 412 and gasoline fuel injectors 422 are mounted onto intake manifold 410. Other method for mounting the fuel injectors can be used such as mounting the fuel injectors so that they can inject the fuel directly into the combustion chambers of the engine (an arrangement commonly known as direct injection).

This embodiment of the device of the present invention may be similarly packaged and prepared as a kit in the same fashion of the embodiment shown in FIG. 2. That is, the device may be packaged as a kit where one part of the kit is a housing having disposed therein processor 400 with various outputs that serve as control lines (e.g., 402-408 or generally N control lines) and various inputs lines ($I_1, \ldots, I_N$), where N is an integer equal to 1 or greater, connected to the different sensors and monitoring devices of the engine. For example, the input lines may carry signals from sensors and/or monitoring devices such as a $\lambda$ sensor, an acceleration pedal, throttle position indicator, air mass flow sensor, $H_2$ sensor (or primary fuel sensor), engine speed monitor, engine temperature sensor, $H_2$ pressure sensor, Boost pressure sensor and ambient conditions sensor (e.g., temperature, pressure). The values of these different sensors, monitoring devices, and indicators are engine parameters which can be used by the processor 400 to determine the power requirement of the engine and other status of the engine. The $H_2$ sensor or primary fuel sensor may act in concert with a primary fuel shut off valve (not shown) to shut off the primary fuel when the sensor has detected a primary fuel leakage. The primary fuel then becomes unavailable. The primary fuel shut off valve may be positioned within or in line with the primary fuel line and is controllable by the processor 400 automatically shut off the primary fuel upon receiving a signal from the primary fuel sensor (e.g., $H_2$ sensor) indicating a primary fuel leakage causing the engine to be operated using the secondary fuel in a backup mode. Further, an operator of the engine may actuate a switch (not shown) coupled to the processor 400 via one of its input lines to cause the shut off valve to shut off the primary fuel and cause the processor to operate the engine with the secondary fuel in a backup mode. The kit may further comprise a processor controllable throttle, Hydrogen fuel injectors 412 for mounting onto the intake manifold 410 and an accelerator pedal capable of generating an electric or electronic signal indicating pedal position—i.e., an electric accelerator pedal. This electrical or electronic signal can then be received by processor 400 for operation of the engine. The mounting of the Hydrogen gas fuel injectors 412 may involve drilling openings onto the engine body relatively near the existing gasoline fuel injectors 422 and then securing these Hydrogen fuel injectors 412 through these openings. Other methods for mounting the Hydrogen fuel injectors 412 can be used. The Hydrogen fuel injectors (as well as the gasoline fuel injectors) may be mounted and positioned with respect to the combustion chambers so that Hydrogen fuel or gasoline fuel or both can be injected directly into the combustion chambers of the engine. In other embodiments, it will be readily understood that the processor 400 may be integrated into an existing Engine Control Unit (ECU) of the vehicle or system; that is, additional instructions can be programmed into the ECU to perform the steps of the method, device and system of the present invention thus avoiding the use of an additional processor such as processor 400.

On the exhaust side of the engine 424, there is exhaust manifold 430 from which exhaust pipe 440 extends. The path of the exhaust gases is shown by arrow 438. The exhaust gases flow through exhaust pipe 440 to catalytic converter 434 which serves to reduce the amount of harmful gases emitted into the environment. Fresh air is provided by air pump 432 which is controlled by processor 400 via control line 402. The fresh air is piped through air intake conduit 436 and is cooled by cooling device 428 before it is delivered to throttle 426, which is controlled by processor 400 via control line 408.

Although not shown, there exist one or more fuel sensors (e.g., fuel leakage sensors, empty tank sensors) in the device of the present invention as shown in FIGS. 2 and 4. These sensors are coupled to or are in communication with the processor 200, 400 via one of the N control lines to signal the processor the occurrence of a fuel leak, an empty fuel tank or any other events of unavailability of the primary fuel. A fuel leak is detected by one of the fuel sensors which causes the processor to shut off the primary fuel source (making the primary fuel unavailable) to avoid unsafe conditions. As described infra with respect to the method of the present invention, the processor 200, 400 calculates a backup set of parameters to operate the engine using the secondary fuel at $\lambda=1$ when the primary fuel is unavailable. The secondary fuel thus acts as a backup fuel in this situation.

The device of the present invention as shown in FIGS. 2 and 4 and discussed supra also represents a system for controlling a bi-fuel engine where a processor is used to control the fuel intake and air supply of the engine to operate the engine at acceptable air fuel ratios and avoid forbidden air fuel ratios. The device of the present invention has been discussed in the context of a vehicle engine. However, the device of the present invention is also a system where a primary fuel is burned for various applications other than for vehicles or transportation machines. For example, an internal combustion engine can be used to burn a primary fuel such as Hydrogen gas and also a secondary fuel such as gasoline to generate electricity. It will be readily obvious to one skilled in this art that other applications using a primary and secondary fuel burning internal combustion engine as per the method and device of the present invention can be used for many other applications and not limited to vehicles or the generation of electric power. As such, the system of the present invention may contain the same or similar components as described in FIGS. 2 and 4, but may be distributed over an area where some or none of the components are co-located with respect to other components. Further, in contrast to the vehicle application, some or none of the components of the system may not be portable.

Referring to FIGS. 2 and 4 the fuel distribution mechanisms and air distribution mechanisms described may use one or more additional pumping mechanisms to deliver fresh air, the primary fuel and secondary fuel to the engine. For example, in FIG. 2, air intake conduit 244 and in FIG. 4, air intake conduit 436 may have coupled to them additional pumping mechanisms to deliver the fresh air to the engine 224 and 424 respectively; this is because the length of the air conduit may require such additional pumps to deliver the fresh air over a relatively much longer distance in non-portable applications such as using the engine to generate electric power. Another example, are the control lines from processor 200 and 400 to the various controllable components wherein such control lines may be implemented as wireless transmission systems, electrical (using wires, or coaxial cables, for example) communication systems, optical signal communication systems (using optical fibers) where each such line can be a channel of an overall communication system. Similarly, the exhaust system in which part or all of the exhaust gases are re-routed, can be part of an overall system in which relatively long exhaust piping with additional pumping mechanisms are used to pump the exhaust gases and reduce harmful emissions into the environment. The input signals to the processors of FIGS. 2 and 4 may also be part of the same communication system used to control the various components of the system; that is, various monitoring components and/or sensors can transmit their values to the processor to allow the system, method and device of the present to operate as has been described above.

Another embodiment of the present invention provides a bi-fuel engine that can achieve increased output power using a primary fuel (e.g., Hydrogen gas) or a mixture of the primary and secondary fuels for three modes of power. This embodiment includes naturally aspirated engines, turbocharged or supercharged engines. Lean operation of this embodiment of such an engine is preferable. Also, the device, method and system of this embodiment may be packaged as a kit similar to the previously described kits for the other embodiments already discussed.

A first power mode is the operation of the engine with the primary fuel (e.g., Hydrogen fuel) using a naturally aspirated engine fitted with a turbocharger. The turbocharger may be a Variable Turbine Geometry (VTG) turbocharger. When the turbocharger is activated by the processor and driven by exhaust gases, the engine is said to be in the charged mode. Although not shown, it will be readily understood by one skilled in the art that a processor controlled shut off valve positioned within or in line with exhaust pipe 240 can be controlled by processor 200 to shut off any exhaust gas flow to the turbocharger 232 in case the engine is to be operated in the no charge mode. The engine is aspirated through air conduit 244 or in the alternative an additional air conduit (not shown) can be coupled to throttle 226 for no charge operation with a valve (not shown) positioned therein to shut off air flow when the engine is operating in this mode.

A second power mode includes a turbocharged engine (or a supercharged engine) that is calibrated and retrofitted with a second turbocharger, which can be activated to obtain increased output power of the engine using the primary fuel. For the two turbocharger embodiment, when the engine is operated with the primary fuel and increased power is required, the originally designed turbocharger is deactivated or bypassed (i.e., no exhaust gases engage its turbines) and the second turbocharger is activated and the engine is operated using quality control; that is, exhaust gases are routed (through control of the waste gate 236) to engage the turbine 232B driving the shaft 232C to cause compressor 232A to pump fresh air into the engine with the throttle in a wide open position. The proper size of the second turbocharger is selected such that the exhaust gases of the primary fuel can engage such turbocharger to provide the requested additional power. In this second power mode, the new or additional turbocharger can be a Variable Turbine Geometry (VTG) turbocharger. The additional or new turbocharger is selected not only to be driven by the exhaust gases of the primary fuel but also to operate at the required range of engine resistance.

In the second power mode, only one of the two turbochargers or superchargers is shown (see FIGS. 2 and 4). The originally designed turbocharger or supercharger is not shown for ease of explanation. However, it will be understood that the originally designed turbocharger or supercharger may have the same configuration and arrangement as the second turbocharger as shown in FIGS. 2 and 4. For a supercharged engine, when operating with the primary fuel, the processor 200 can control the original supercharger to provide the proper amount of air to be pumped into the engine.

A third power mode uses a turbocharged engine with a turbo charger having a wide operating temperature range of operation (i.e., exhaust gas temperature) and thus can be operated with either the primary or secondary fuel. This particular turbo charger can be driven by the exhaust gases of a primary fuel such as Hydrogen gas or the exhaust gases of a secondary fuel such as gasoline. One example of such a turbocharger is what we will refer to as a SuperVTG turbocharger having a relatively wide temperature range of operation. The SuperVTG is different from the VTG heretofore mentioned in that the SuperVTG can operate for a relatively wide temperature range so that it can operate with the exhaust gases of the primary or the secondary fuels. As with the first and second power modes, this third power mode provides increased output power of the engine in charged mode using the primary fuel and the technique of operation referred to as quality control.

The three power modes use the turbo charger 232 activated by the processor (by allowing exhaust gases to engage turbines of turbo charger 232) and driven by exhaust gases from the combustion of the primary fuel (e.g., Hydrogen) and air in the engine cylinders causing fresh air to be pumped into the engine by compressor 232A while the processor controls the throttle of the engine. Also in the third power mode a turbocharger which can be driven by exhaust the exhaust gases from the combustion of air and either the primary or secondary fuel is used. Alternatively, the three power modes may use a processor controlled supercharger to operate the engine while using quality control. Processor 200 can maintain the throttle in a wide open position in this mode or it can vary the opening of the throttle (i.e., throttling the engine) when the engine switches to $\lambda=1$ operation. The first, second and third power modes are referred to as charged modes when the turbocharger (a second turbocharger in the case of a turbocharged engine) is activated and driven to provide the extra output power using the exhaust gases of the primary fuel and the technique of quality control. In the charged mode, the shut off valve (not shown) in exhaust pipe 240 is controlled by processor 200 to allow exhaust gases to flow to turbine 232B of the turbocharger 232. The waste gate 236 is controlled by processor 200 to prevent exhaust gases from flowing through bypass exhaust pipe 242. However, at various times, in order to increase engine boost pressure, processor 200 may control waste gate 236 to allow some amount of exhaust gas flow through bypass exhaust pipe 242 for certain time periods.

The three power modes can also use a supercharger (electrically or electronically controlled by the processor 200) instead of a turbocharger in which case, the processor 200 controls the amount of power provided to the supercharger. Further, for the second power mode a supercharger can be used as an air pump instead of a second turbocharger. The engine is operated using quality control while preferably in lean mode. For applications where the requested power cannot be provided with lean operation the engine switches to operation with $\lambda=1$, the engine can be throttled (i.e., throttle position varied as per engine power requirements) to control engine output power.

Figure 5:
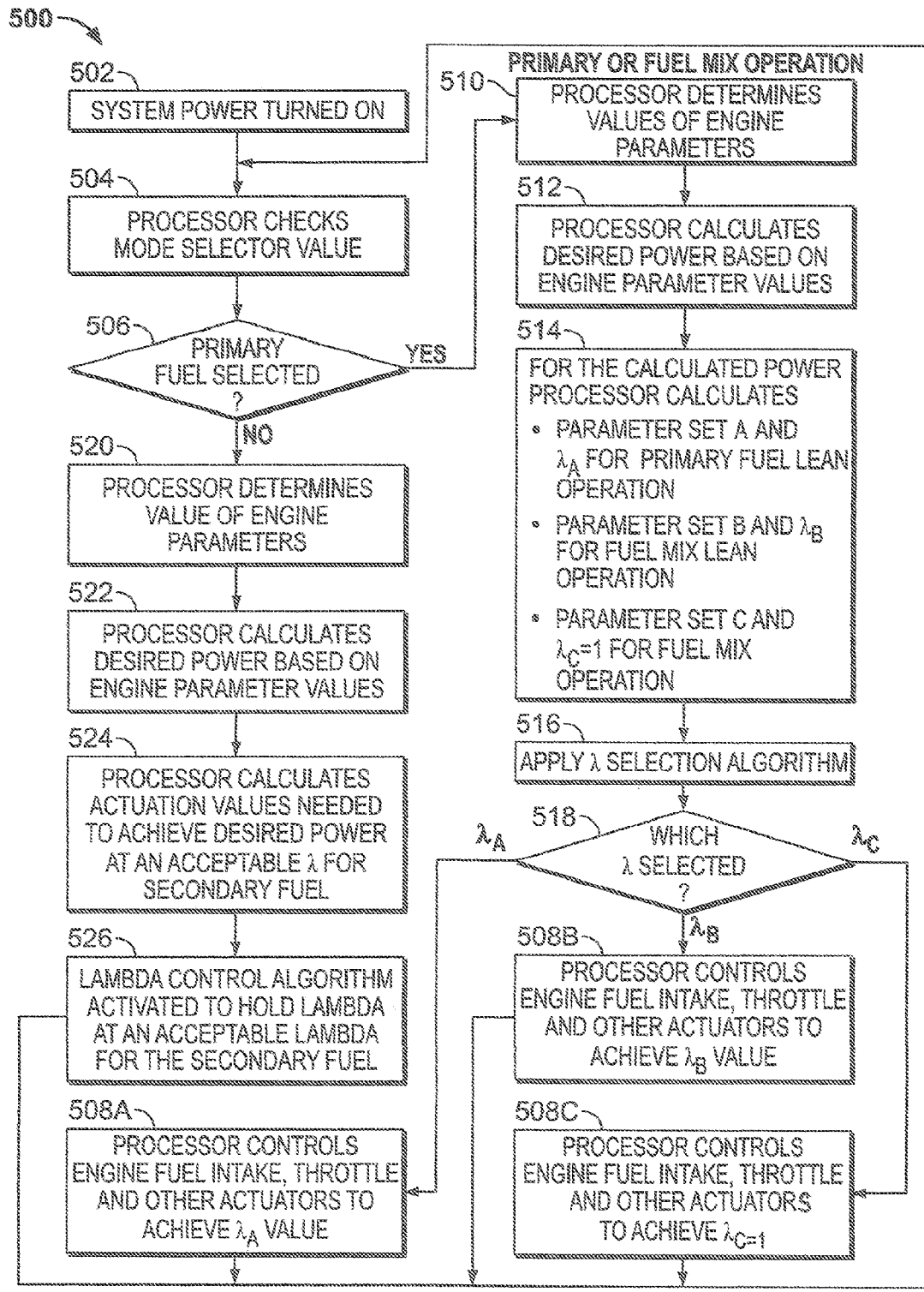
FIG. 5 shows a flow chart of the method of the present invention.

Referring now to FIG. 5, there is shown a flow chart 500 of the method of the present invention applicable to the system and device of the present invention, embodiments of which are depicted in FIGS. 2 and 4 as described above. For ease of explanation, the method of the present invention will be described in the context of a vehicle engine.

In step 502, the system power is switched on; this encompasses providing power to the processor (200 in FIG. 2, 400 in FIG. 4) and igniting the engine 224, 424. In step 504, the processor determines the value of a mode selector switch (not shown in FIG. 2 or 4) indicating whether primary fuel or secondary fuel operation has been selected. Alternatively, the operator may make a selection after the system is turned on. In step 506, the processor, based on the value of the mode selector switch, determines whether primary fuel operation has been selected. If primary fuel has not been selected, the method of the present invention moves to step 520 for operation using the secondary fuel. If primary fuel operation is selected, the method of the present invention moves to step 510.

In step 510, the method of the present invention determines values of engine parameters being provided by the various sensors, monitoring devices and indicators sending information to the processor 200, 400 via the input lines $I_1, \ldots, I_N$. The value of the engine parameters may include the result of a request made by an operator of the engine. In step 512, the processor 200, 400 calculates the power requirement of the engine based on the engine parameter values (e.g., position of the accelerator pedal and engine speed). The power requirement may be the result of a request made by the operator of the engine to increase or decrease power. Once the power requirement for the engine has been calculated and the values of the various engine parameters have been gathered, the method of the present invention moves to step 514.

In step 514, based on the calculated power requirement from step 512 and the engine parameter values, the processor 200, 400 calculates three sets of parameter values to control the engine. The three sets of parameter values correspond to two possibilities for lean operation and the $\lambda=1$ operation. Lean operation can be achieved using the primary fuel only or a mixture of the primary fuel and secondary fuel. For $\lambda=1$ operation, a mixture of the primary fuel and secondary fuel is used. Each of the three set of parameter values contains a backup set of parameter values which are used to operate the engine using the secondary fuel with an air fuel ratio corresponding to a lean acceptable $\lambda$ or with an air fuel ratio corresponding to $\lambda=1$. These backup sets of engine parameter values are used when the primary fuel is not available due to the shutting off of the primary fuel by the system when a dangerous condition is detected (e.g., fuel leak is detected) or when the primary fuel tank is empty or if operator chooses to operate the engine with the secondary fuel only; these situations are examples where the primary fuel is said to be unavailable. The secondary fuel is thus used as a backup fuel in these situations. The parameter values are values used to control such components (i.e., actuators) as throttle 226, 426, gasoline fuel injectors 222, 422, hydrogen fuel injectors 212, 412, waste gate 236, turbo charger 232 and air pump 432. Each of the set of parameter values calculated to control the engine includes a λ value that will determine the particular operation of the engine. The power requirement may be achieved using either the primary fuel only with a first corresponding λ value, a mixture of the primary fuel and secondary fuel at a second corresponding λ value, or a mixture of the primary fuel and secondary fuel at λ=1. Parameter set A are parameter values (e.g., amount of fuel to be injected and amount of air to be pumped into the engine) calculated to achieve the power requirement using the primary fuel with a resulting λ value of $\lambda_A$. Parameter set B are parameter values calculated to achieve the power requirement using a primary/secondary fuel mixture with a resulting λ value of $\lambda_B$. Parameter sets A and B are for lean operation using either the primary fuel only or a mixture of the primary and secondary fuels. For certain secondary fuels such as gasoline, lean operation using a mixture of the secondary and primary fuels does not provide an acceptable λ and thus such operation is not used. Parameter set C are parameter values calculated to achieve the power requirement using a primary/secondary fuel mixture for λ=1 operation. The calculations performed in step 514 may also be done in anticipation of a power requirement request for switching the engine from lean operation to λ=1 operation or switching the engine from λ=1 operation to lean operation. The parameter values are stored by processor 200, 400. For each of the parameters sets mentioned, when the primary fuel is not available, there is a backup set of parameters which are used to operate the engine using only the secondary fuel at a preferably lean λ or if lean operation is not possible, at an air fuel ratio corresponding to λ=1. The secondary fuel is thus used in this mode of operation called the backup mode. The method of the present invention may switch operation to the backup mode at some time during engine operation after the primary fuel becomes unavailable. The backup set of parameter values for the backup mode are pre-calculated and are ready to be applied regardless of which set of parameter values the engine is currently using. During backup mode, the method of the present invention pre-calculates sets of parameters for primary fuel operation (lean mode) or mixture of primary fuel and secondary fuel (lean mode or λ=1 mode) to be ready to switch to those modes of operation should the primary fuel become available.

In step 516, the method of the present invention applies a λ selection algorithm which chooses which parameter set is to be used to control the engine. One example of the λ selection value is as follows: if $\lambda_A$ is acceptable and $\lambda_B$ is not acceptable, the method moves to step 508A to control the various components using the parameter values of parameter set A to operate the engine in a lean mode using the primary fuel only. When $\lambda=\lambda_B$ is acceptable and $\lambda=\lambda_A$ is not acceptable and the only other option is λ=1, $\lambda_B$ is selected. The method of the present invention moves to step 508B to control the engine in lean mode of operation using a mixture of the primary and secondary fuels. When both $\lambda_A$ and $\lambda_B$ are acceptable, the method of the present invention selects the leaner λ, i.e., the λ having the higher value. When neither $\lambda_A$ nor $\lambda_B$ is acceptable, λ=1 operation is selected and the method of the present invention moves to step 508C to control operation of the engine using a proper mixture of the primary and secondary fuels. As explained above, when the system detects any problem in the primary fuel supply system, such as leakages or an empty primary fuel tank, the method of the present invention moves to a backup mode using a subset of parameters to control operation of the engine (not shown) using the secondary fuel.

In steps 508A, 508B and 508C, the processor 200, 400 controls the throttle 226, 426 and fuel injectors, 212, 412 and 222, 422 to achieve the power requirements and the corresponding λ values. That is, for acceptable lean λ values, the method of the present invention uses quality control to operate the engine and for λ=1, the method of the present invention uses quantity control to operate the engine.

Returning to step 506, if primary fuel operation is not selected, the method of the present invention moves to step 520. In step 520 the method of the present invention determines values of engine parameters being provided by the various sensors, monitoring devices and indicators sending information to the processor 200, 400 via the input lines $I_1, \ldots, I_N$. The value of the engine parameters may be the result of a request made by an operator of the engine. In step 522, the processor 200, 400 calculates the power requirement of the engine based on the engine parameter values (e.g., position of the accelerator pedal and engine speed). The power requirement may be the result of a request made by the operator of the engine to increase or decrease power. Once the power requirement for the engine has been calculated and the values of the various engine parameters have been gathered, the method of the present invention moves to step 524 In step 524, the processor calculates the parameter values (i.e., a first parameter set) to achieve the requested power requirement and the corresponding λ value. Also, in step 524 the processor calculates parameter values (i.e., a second parameter set) for λ=1. In step 526, the processor controls the fuel injectors and throttle to control the operation of the engine at the corresponding λ value from step 524 using quality control. If the λ value is not acceptable, then the parameter values for λ=1 is used to control the operation of the engine using quantity control. It should be noted that while the engine is being operated with the secondary fuel at the corresponding λ the parameter values for λ=1 operation are being calculated in anticipation to a switch to an operation using the parameter set having a λ equal to 1. Conversely, while the engine is being operated with a λ=1, the parameter values and corresponding acceptable λ that meet the power requirements are being calculated in anticipation of a switch from the λ=1 operation. It should also be noted that while the engine is being operated using the secondary fuel, the user of the engine may intentionally switch to the backup mode causing the method of the present invention to switch operation to the backup mode using the pre-calculated engine parameter values. During backup mode operation, the method of the present invention may pre-calculate parameter values for secondary fuel operation when primary fuel is available in anticipation of the user making the primary fuel available. Thus the backup parameter values used for secondary fuel operation when the primary fuel is not available are not necessarily equal to the parameter values for secondary fuel operation when the primary fuel is available.

Figure 6:
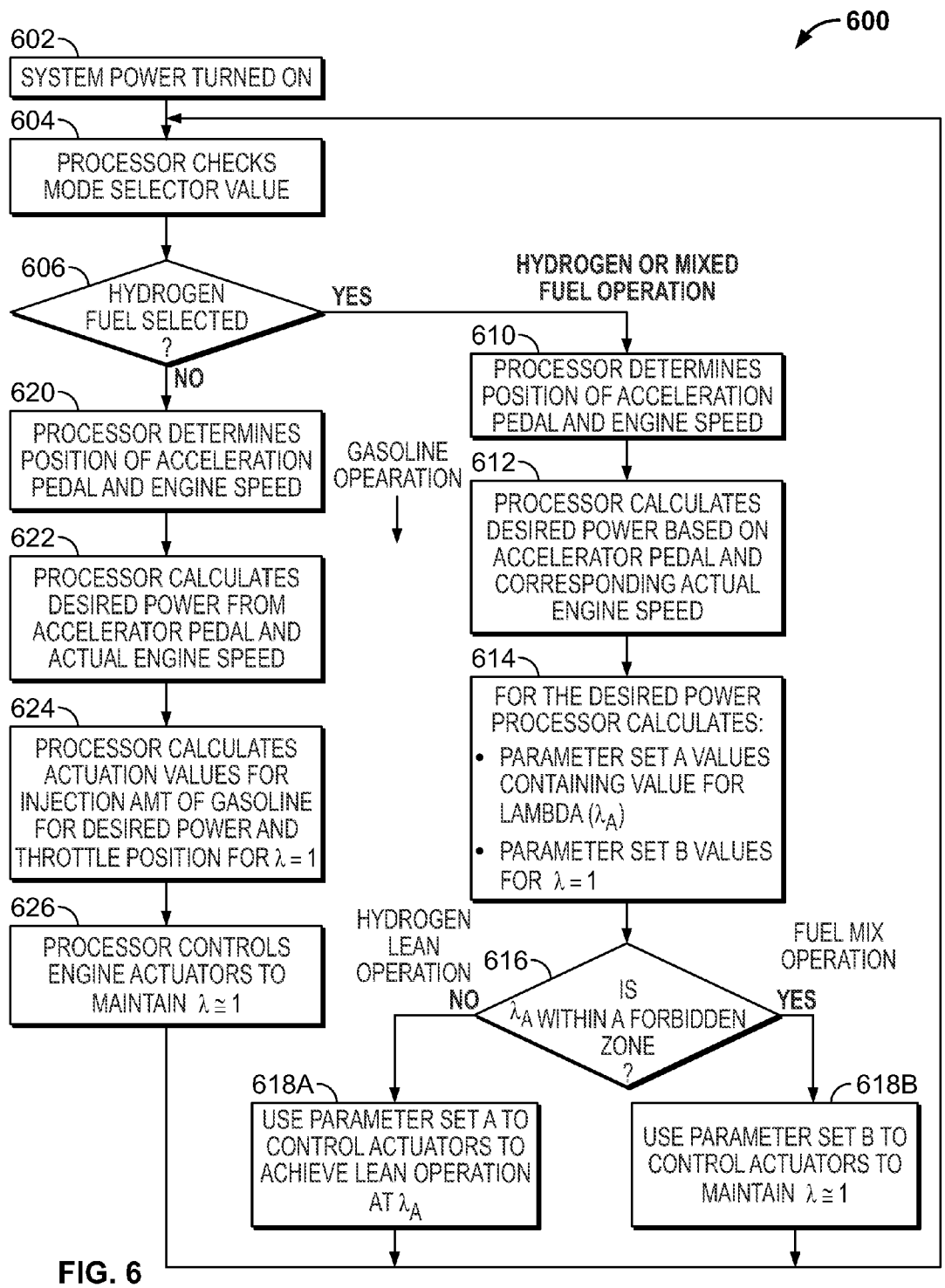
FIG. 6 shows a flow chart of the method of the present invention for a vehicle engine using Hydrogen as a primary fuel and gasoline as a secondary fuel.

Referring now to FIG. 6, there is shown a flow chart 600 of the method of the present invention applicable to the system and device of the present invention, embodiments of which are depicted in FIGS. 2 and 4 as described above. Flow chart 600 represents the method of the present invention where the primary fuel is Hydrogen and the secondary fuel is gasoline. For ease of explanation, the method of the present invention will be described in the context of a vehicle engine.

In step 602, the system power is switched on; this encompasses providing power to the processor (200 in FIG. 2, 400 in FIG. 4) and igniting the engine 224, 424. In step 604, the processor determines whether Hydrogen fuel operation is indicated by the value of a mode selector switch (not shown in FIG. 2 or 4). The operator of the system may have access to the mode selector switch (not shown) which may be connected to one of the inputs of processor 200, 400 and may select Hydrogen fuel operation immediately prior to turning on the system. Alternatively, the operator may make a selection after the system is turned on. In step 606, the processor, based on the value of the mode selector switch, determines whether Hydrogen fuel operation has been selected. If Hydrogen fuel operation has not been selected, the method of the present invention moves to step 620 for operation using gasoline as the fuel. If Hydrogen fuel operation is selected, the method of the present invention moves to step 610.

In step 610, the method of the present invention determines values of engine parameters (e.g., acceleration pedal position and engine speed) being provided by the various sensors, monitoring devices and indicators sending information to the processor 200, 400 via the input lines $I_1, \ldots, I_N$. The value of the engine parameters may be the result of a request made by an operator of the engine. In step 612, the processor 200, 400 calculates the power requirement of the engine based on the engine parameter values (e.g., position of the accelerator pedal and engine speed). The power requirement may be the result of a request made by the operator of the engine to increase or decrease power. Once the power requirement for the engine has been calculated and the values of the various engine parameters have been gathered, the method of the present invention moves to step 614.

In step 614, based on the calculated power requirement from step 612 and the engine parameter values, the processor 200, 400 calculates two sets of parameters that can be used as parameter values to control the engine. The two sets of parameters correspond to lean operation and the $\lambda=1$ operation. Lean operation can be achieved using Hydrogen only at acceptable $\lambda$ values. For $\lambda=1$ operation, a mixture of Hydrogen and gasoline can therefore be used. The parameter values are values used to control such components (i.e., actuators) as throttle 226, 426, gasoline fuel injectors 222, 422, hydrogen fuel injectors 212, 412, waste gate 236, turbo charger 232 and air pump 432. Each of the set of parameters calculated to control the engine includes a $\lambda$ value that will determine the particular operation of the engine. The power requirement may be achieved using either Hydrogen with a corresponding $\lambda$ value, or a mixture of Hydrogen and gasoline at $\lambda=1$. Parameter set A are parameter values (e.g., amount of fuel to be injected and amount of air to be pumped) calculated to achieve the power requirement using Hydrogen with a resulting $\lambda$ value of $\lambda_A$. Parameter set B are parameter values calculated to achieve the power requirement using a Hydrogen/gasoline fuel mixture for $\lambda=1$ operation. The calculations performed in step 614 may be done in anticipation of a power requirement request for switching the engine from lean operation to $\lambda=1$ operation or switching the engine from $\lambda=1$ operation using a mix of Hydrogen and gasoline to an acceptable $\lambda$ using Hydrogen in lean mode operation. The parameter values are stored by processor 200, 400. The parameter values also include a backup set for operation when Hydrogen is not available. For example, a Hydrogen gas leakage detector or other fuel sensor (not shown) can be used to detect fuel leakages that may lead to unsafe operation of the engine. The fuel sensor preferably positioned proximate the Hydrogen fuel line is coupled to or communicates with the processor to inform the processor of the occurrence of a fuel leak. The system pre-calculates the parameter values needed to operate at $\lambda=1$ using only gasoline. This is a backup mode for situations when Hydrogen is not available because it has been shut off for safety considerations or the Hydrogen gas is exhausted (empty tank) or the user shuts off the Hydrogen gas. The method of the present invention may return to operation using Hydrogen if it becomes available.

In step 616, the method of the present invention determines whether $\lambda_A$ is acceptable. If $\lambda_A$ is not within a forbidden zone and is therefore acceptable, the method of the present invention moves to step 618A to operate the engine in lean mode using the parameter set A values. That is, in step 618A the processor 200, 400 controls the throttle 226, 426 and fuel injectors 212, 412 to achieve the power requirement at an acceptable $\lambda$ using quality control. If $\lambda_A$ is not acceptable and thus operation to meet the power requirement cannot be performed using Hydrogen only, the method of the present invention moves to step 618B. In step 618B, processor 200, 400 controls the throttle 226, 426 and fuel injectors to inject the proper amounts of Hydrogen and gasoline to achieve the power requirement at $\lambda=1$. During operation using Hydrogen or a mixture of Hydrogen and gasoline, the system will switch to operation using gasoline if (1) Hydrogen is no longer available because the Hydrogen fuel tank is empty or (2) there is a leakage of Hydrogen fuel detected causing the system to shut off the source of the Hydrogen fuel, or (3) if operator switches to run the engine with the secondary fuel or shuts off the Hydrogen fuel.

Returning to step 606, if Hydrogen fuel operation is not selected, the method of the present invention moves to step 620. In step 620 the method of the present invention determines values of engine parameters being provided by the various sensors, monitoring devices and indicators sending information to the processor 200, 400 via the input lines $I_1, \ldots, I_N$. The engine is operated using gasoline. Therefore, the value of $\lambda$ is maintained at $\lambda=1$ regardless of the power requirement request by an operator of the engine. In step 622, the processor 200, 400 calculates the power requirement of the engine based on the engine parameter values (e.g., position of the accelerator pedal and engine speed). The power requirement may be the result of a request made by the operator of the engine to increase or decrease power. Once the power requirement for the engine has been calculated and the values of the various engine parameters have been gathered, the method of the present invention moves to step 624 In step 624, the processor calculates the parameter values to achieve the requested power requirement for $\lambda=1$ operation. In step 626, the processor controls the fuel injectors and throttle to control the operation of the engine maintaining a value of $\lambda$ equal to 1 using quantity control.

The device, system and method of the present invention has have been described in terms of various embodiments as described herein. It will be readily understood that the embodiments disclosed herein do not at all limit the scope of the present invention. One of ordinary skill in the art to which this invention belongs can, after having read the disclosure may implement the device, system and method of the present invention using other implementations that are different from those disclosed herein but which are well within the scope of the claimed invention.

What is claimed is:

1. A device for controlling a bi-fuel engine, the device comprising:
   a processor coupled to the engine; and
   an air pump coupled to the engine and processor and said air pump is controlled by the processor to provide air to the engine
   where to meet engine power requirements, the processor calculates acceptable $\lambda$ values based on measured engine parameter values, and operates the engine at one of first, second and third acceptable $\lambda$ values avoiding forbidden $\lambda$ values, the processor operating the engine in a first lean mode using a primary fuel at a first acceptable λ value;

the processor operating the engine in a second lean mode using a mixture of the primary fuel and a secondary fuel at a second acceptable λ value;

the processor operating the engine in a λ=1 mode using a mixture of the primary and secondary fuels;

where, in anticipation of changing engine power requirements, during lean mode operation, the processor calculates engine parameter values needed to switch to λ=1 operation, and during λ=1 operation, the processor calculates the engine parameter values needed to switch to lean mode operation where λ is a ratio of actual air fuel ratio to stoichiometric air fuel.

2. The device of claim 1 where the processor further controls fuel intake to operate the engine and said fuel intake comprising processor controllable fuel injectors for the primary fuel and processor controllable fuel injectors for the secondary fuel.

3. The device of claim 2 where the fuel injectors for the primary and secondary fuels are mounted on an intake manifold of the engine.

4. The device of claim 2 where the fuel injectors for the primary and secondary fuels are mounted such that fuel is injected directly into combustion chambers of the engine.

5. The device of claim 2 where the primary fuel injectors are coupled to a first fuel line and the secondary fuel injectors are coupled to a second fuel line where the first fuel line is further coupled to a primary fuel tank and the second fuel line is further coupled to a secondary fuel tank.

6. The device of claim 2 where either the fuel injectors for the primary fuel or the fuel injectors for the secondary fuel are positioned such that either the primary fuel or the secondary fuel or both fuels are injected directly into the combustion chambers of the engine.

7. The device of claim 5 where a processor controlled primary fuel shut off valve is positioned in line with or within the first fuel line which valve is controlled by the processor to shut off the primary fuel upon receiving a signal over an input line coupled to a fuel sensor or an operator controlled switch causing the engine to shut off the primary fuel and operate the engine in a backup mode.

8. The device of claim 1 where the forbidden λ values are outside an efficient working range of a catalytic converter of the engine and results in production of harmful exhaust gases and the acceptable λ values are within the efficient working range of the catalytic converter.

9. The device of claim 1 where the air pump is coupled to an air intake conduit of the engine, which is coupled to a processor controlled throttle of the engine.

10. The device of claim 9 where the air pump is a turbocharger comprising a turbine positioned within or in line with an exhaust pipe of the engine, a shaft coupled to the turbine; and a compressor driven by the shaft where said compressor is positioned within or in line with the air intake conduit.

11. The device of claim 10 where the turbocharger is a Variable Turbine Geometry turbocharger.

12. The device of claim 10 where the turbocharger is a Super Variable Turbine Geometry turbocharger having a relatively wide operating temperature range to allow operation with either the primary or secondary fuel.

13. The device of claim 9 where the air pump is a processor controllable supercharger.

14. The device of claim 1 where the processor has N input lines and N control lines where N is an integer equal to 1 or greater and the input lines are coupled to sensors or monitoring devices of the engine to provide the engine parameter values to the processor and the N control lines carry signals from the processor to control one or more actuators of the engine.

15. The device of claim 14 where the sensors or monitoring devices comprise a λ sensor, an acceleration pedal position indicator, throttle position indicator, air mass flow sensor, $H_2$ sensor (or primary fuel sensor), engine speed monitor, engine temperature monitor, $H_2$ pressure sensor, Boost pressure sensor, a vacuum pump sensor and an ambient conditions sensor and the one or more actuators comprise a primary fuel injector, a primary fuel shut off valve, a secondary fuel injector, a processor controllable engine throttle, a waste gate or an air pump.

16. The device of claim 1 where the primary fuel is Hydrogen and the secondary fuel is Compressed Natural Gas.

17. The device of claim 1 where the primary fuel is Hydrogen and the secondary fuel is gasoline and the engine is a naturally aspirated engine.

18. The device of claim 17 where the air pump is a processor controlled supercharger.

19. The device of claim 17 where the processor controls the engine to operate in lean mode using Hydrogen where the air pump is a supercharger coupled to an air intake conduit of the engine and controlled by the processor to cause air to be pumped into a throttle of the engine via an air intake conduit having one end coupled to the supercharger and another end coupled to the throttle and where during lean mode operation the processor maintains the throttle in a wide open position.

20. The device of claim 17 where the processor controls the engine to operate in lean mode using Hydrogen where the air pump is a turbocharger coupled to an exhaust pipe of the engine and driven by exhaust gases of the engine when the processor controls a waste gate actuator of the engine to route the exhaust gases to engage the turbocharger causing air to be pumped into a throttle of the engine via an air intake conduit having one end coupled to the turbocharger and another end coupled to the throttle and where during lean mode operation the processor maintains the throttle in a wide open position.

21. The device of claim 17 where the processor controls the engine to operate in lean mode using Hydrogen where the air pump is a VTG turbocharger coupled to an exhaust pipe of the engine and driven by exhaust gases of the engine when the processor controls a waste gate actuator of the engine to route the exhaust gases to engage the VTG turbocharger causing air to be pumped into a throttle of the engine via an air intake conduit having one end coupled to the turbocharger and another end coupled to the throttle and where during lean mode operation the processor maintains the throttle in a wide open position.

22. The device of claim 17 where the processor controls the engine to operate in lean mode using Hydrogen where the air pump is a relatively wide operating temperature range VTG that can be driven by exhaust gases from Hydrogen or gasoline and said turbocharger is coupled to an exhaust pipe of the engine and driven by exhaust gases of the engine when the processor controls a waste gate actuator of the engine to route the exhaust gases to engage the turbocharger causing air to be pumped into a throttle of the engine via an air intake conduit having one end coupled to the turbocharger and another end coupled to the throttle and where during lean mode operation the processor maintains the throttle in a wide open position.

23. The device of claim 17 where the fuel intake comprises Hydrogen fuel injectors and gasoline fuel injectors where said Hydrogen fuel injectors are coupled to a Hydrogen tank via a fuel line where at least part of said Hydrogen tank is made with alkali metals to which Hydrogen molecules can bound.

24. The device of claim 17 where the processor controls the engine to operate in a λ=1 mode using gasoline or a mixture of Hydrogen and gasoline where the air pump is a turbocharger coupled to an exhaust pipe of the engine and driven by exhaust gases of the engine when the processor controls a waste gate actuator of the engine to route the exhaust gases to engage the turbocharger causing air to be pumped into a throttle of the engine via an air intake conduit having one end coupled to the turbocharger and another end coupled to the throttle and where during λ=1 operation the processor throttles the engine to meet engine output power requirements.

25. The device of claim 1 where the engine is a naturally aspirated engine and where the processor controls the engine to operate in a lean mode using the primary fuel or a mix of the primary and secondary fuels where the air pump is a turbocharger coupled to an exhaust pipe of the engine and driven by exhaust gases of the engine when the processor controls a waste gate actuator of the engine to route the exhaust gases to engage the turbocharger causing air to be pumped into a throttle of the engine via an air intake conduit having one end coupled to the turbocharger and another end coupled to the throttle and where during lean mode operation the processor maintains the engine throttle in a wide open position.

26. The device of claim 1 where the engine is a naturally aspirated engine and where the processor controls the engine to operate in a lean mode using the primary fuel or a mix of the primary and secondary fuels where the air pump is a supercharger coupled to an exhaust pipe of the engine and controlled by the processor to cause air to be pumped into a throttle of the engine via an air intake conduit having one end coupled to the supercharger and another end coupled to the throttle and where during lean mode operation the processor maintains the engine throttle in a wide open position.

27. The device of claim 1 where the engine is a naturally aspirated engine and where the processor controls the engine to operate in a λ=1 mode using the secondary fuel or a mix of the primary and secondary fuels where the air pump is a turbocharger coupled to an exhaust pipe of the engine and driven by exhaust gases of the engine when the processor controls a waste gate actuator of the engine to route the exhaust gases to engage the turbocharger causing air to be pumped into a throttle of the engine via an air intake conduit having one end coupled to the throttle and where during λ=1 operation the processor throttles the engine to meet engine output power requirements.

28. The device of claim 1 where the engine is a naturally aspirated engine and where the processor controls the engine to operate in a λ=1 mode using the secondary fuel or a mix of the primary and secondary fuels where the air pump is a supercharger coupled to an exhaust pipe of the engine and controlled by the processor to cause air to be pumped into a throttle of the engine via an air intake conduit having one end coupled to the supercharger and another end coupled to the throttle and where during λ=1 operation the processor throttles the engine to meet engine output power requirements.

29. A method for operating a bi-fuel engine, the method comprises:
controlling the engine with a processor in one of a first lean mode, a second lean mode and a λ=1 mode where λ is a ratio of air fuel ratio to stoichiometric air fuel ratio;
where to meet engine power requirements a primary fuel is used to operate the engine in the first lean mode at a first acceptable λ value avoiding forbidden λ values; a mixture of the primary fuel and a secondary fuel is used to operate the engine in the second lean mode at a second acceptable λ value avoiding forbidden λ values; a mixture of the primary and secondary fuels is used to operate the engine in a λ=1 mode; and in anticipation of changing engine power requirements, during lean mode operation, the processor calculates engine parameter values needed to switch to λ=1 operation, and during λ=1 operation, the processor calculates engine parameter values needed to switch to lean mode operation.

30. The method of claim 29 where the step of controlling comprises:
selecting a primary fuel or a secondary fuel of operation;
determining engine parameter values;
calculating power requirements from the engine parameter values;
calculating one or more sets of engine parameter values and corresponding λ values based on the calculated power requirements; and
operating the engine using the primary fuel or a mixture of the primary and secondary fuels and one of the calculated set of engine parameter values at an acceptable λ.

31. The method of claim 29 where the step of controlling further comprises operating the engine using the secondary fuel in a backup mode and calculating engine parameter values corresponding to a lean λ or to λ=1 when the primary fuel is unavailable.

32. The method of claim 31 where the step of calculating further comprises calculating engine parameter values corresponding to an acceptable lean λ or to a λ=1 using the primary fuel or a mixture of the primary and secondary fuels in anticipation to a switch in operation in which the primary fuel is available.

33. The method of claim 31 where the step of operating further comprises:
detecting a leakage of the primary fuel or an empty primary fuel tank;
shutting off the primary fuel in the case of a leak; and
using a proper set of engine parameter values and corresponding λ value for operation with the secondary fuel.

34. The method of claim 30 where the fuel of operation selected is the primary fuel and the one or more set of engine parameter values comprise:
a first set of engine parameter values for operation using the primary fuel with a corresponding first λ;
a second set of engine parameter values for operation using a primary fuel and secondary fuel mixture with a corresponding second λ;
a third set of parameters for operation using the primary fuel and secondary fuel mixture with a λ=1; and
selecting one of the set of parameters having an acceptable λ to operate the engine.

35. The method of claim 34 where the first and second set of parameters preferably correspond to lean modes of operation where the corresponding first λ, and second corresponding λ both have a value greater than 1.

36. The method of claim 34 where the selected λ is equal to 1 when neither the first λ nor the second λ is acceptable.

37. The method of claim 34 where the engine has a combustion chamber with an inlet valve and the primary fuel is hydrogen where the first and second set of parameters preferably correspond to lean modes of operation with the corresponding first λ and second λ both having a value greater than 1 and where hydrogen injection is calibrated such that the hydrogen-air mixture enters the combustion chamber before the inlet valve closes and therefore air is placed within the combustion chamber in front of the closed inlet valve.

38. The method of claim 30 where the fuel of operation selected is the secondary fuel and the one or more set of engine parameter values calculated comprise:
 a first set of engine parameter values for operation using the secondary fuel with a corresponding λ; and
 a second set of engine parameter values for operation using the secondary fuel with λ=1; and
 selecting one of the sets of engine parameter values having an acceptable λ to operate the engine.

39. The method of claim 29 where the first set of parameters corresponds to a lean mode of operation where the corresponding λ has a value greater than 1.

40. The method of claim 38 where the selected λ is equal to 1 when the corresponding first λ is not acceptable.

41. The method of claim 29 where the bi-fuel engine is a naturally aspirated gasoline engine retrofitted and calibrated to operate using Hydrogen as the primary fuel and gasoline as the secondary fuel where operation using Hydrogen comprises:
 determining accelerator pedal position;
 calculating desired power based on at least the accelerator pedal position;
 calculating, based on the calculated power, a first set of engine parameter values with a corresponding λ for Hydrogen operation;
 calculating, based on the calculated power, a second set of engine parameter values for a corresponding λ=1 for Hydrogen and gasoline mix fuel operation;
 selecting the first set of engine parameter values when the corresponding λ is acceptable;
 selecting the second set of engine parameter values when the corresponding λ is not acceptable;
 operating the engine using Hydrogen and quality control when the corresponding λ is selected; and
 operating the engine using a Hydrogen gasoline fuel mix when λ=1 is selected.

42. The method of claim 29 where the bi-fuel engine is a turbocharged gasoline engine retrofitted and calibrated to operate using Hydrogen as the primary fuel and gasoline as the secondary fuel where operation using Hydrogen comprises:
 determining accelerator pedal position;
 calculating desired power based on at least the accelerator pedal position;
 calculating, based on the calculated power, a first set of engine parameter values with a corresponding λ for Hydrogen operation;
 calculating, based on the calculated power, a second set of engine parameter values for a corresponding λ=1 for Hydrogen and gasoline mix fuel operation;
 selecting the first set of engine parameter values when the corresponding λ is acceptable;
 selecting the second set of engine parameter values when the corresponding λ is not acceptable;
 operating the engine using Hydrogen and quality control when the corresponding λ is selected; and
 operating the engine using a Hydrogen gasoline fuel mix when λ=1 is selected.

43. The method of claim 29 where the bi-fuel engine is a supercharged gasoline engine retrofitted and calibrated to operate using Hydrogen as the primary fuel and gasoline as the secondary fuel where operation using Hydrogen comprises:
 determining accelerator pedal position;
 calculating desired power based on at least the accelerator pedal position;
 calculating, based on the calculated power, a first set of engine parameter values with a corresponding λ for Hydrogen operation;
 calculating, based on the calculated power, a second set of engine parameter values for a corresponding λ=1 for Hydrogen and gasoline mix fuel operation;
 selecting the first set of engine parameter values when the corresponding λ is acceptable;
 selecting the second set of engine parameter values when the corresponding λ is not acceptable;
 operating the engine using Hydrogen and quality control when the corresponding λ is selected; and
 operating the engine using a Hydrogen gasoline fuel mix when λ=1 mode is selected.

44. The method of claim 29 where the bi-fuel engine is a naturally aspirated gasoline engine retrofitted and calibrated to operate using Hydrogen as the primary fuel and gasoline as the secondary fuel where operation using gasoline comprises:
 determining accelerator pedal position;
 calculating desired power based on at least the accelerator pedal position;
 calculating, based on the calculated power, a set of engine parameter values with λ=1 for gasoline operation; and
 operating the engine using gasoline maintaining the value of λ at 1.

45. The method of claim 29 where the bi-fuel engine is a turbocharged gasoline engine retrofitted and calibrated to operate using Hydrogen as the primary fuel and gasoline as the secondary fuel where operation using gasoline comprises:
 determining accelerator pedal position;
 calculating desired power based on at least the accelerator pedal position;
 calculating, based on the calculated power, a set of engine parameter values with λ=1 for gasoline operation; and
 operating the engine using gasoline maintaining the value of λ at 1.

46. The method of claim 29 where the bi-fuel engine is a supercharged gasoline engine retrofitted and calibrated to operate using Hydrogen as the primary fuel and gasoline as the secondary fuel where operation using gasoline comprises:
 determining accelerator pedal position;
 calculating desired power based on at least the accelerator pedal position;
 calculating, based on the calculated power, a set of engine parameter values with λ=1 for gasoline operation; and
 operating the engine using gasoline maintaining the value of λ at 1.

47. The method of claim 46 where the accelerator is an electric accelerator pedal.

48. The method of claim 29 where the primary fuel is a gaseous fuel and the secondary fuel is a liquid fuel, the fuels being injected such that the liquid fuel enters into a combustion chamber before the gaseous fuel where the injection of the gaseous fuel is calibrated such that a primary air fuel mixture enters the combustion chamber before an inlet valve of the chamber closes and therefore air is placed within the combustion chamber in front of the closed inlet valve.

49. The method of claim 48 where the primary gaseous fuel is hydrogen.

50. A cross platform kit for retrofitting an engine to convert the engine to a bi-fuel engine where one of the fuels is a non-carbon based fuel, the kit comprises:
 a processor;
 an air pump; and
 a fuel intake assembly where the processor, air pump and fuel intake assembly are installed on the engine such that the processor controls the air pump and fuel intake assembly to provide air to the engine and operate the engine where to meet engine power requirements, the processor calculates acceptable λ values based on measured engine parameter values, and operates the engine at one of first, second and third acceptable λ values avoiding forbidden λ values, the processor operating the engine in a lean mode using a primary fuel at a first acceptable λ value;

the processor operating the engine in a lean mode using one of the primary fuel and a mixture of the primary fuel and a secondary fuel at a second acceptable λ value;

the processor operating the engine in a λ=1 mode using a mixture of the primary and secondary fuels;

where, in accordance with changing engine power requirements, during lean mode operation, the processor calculates engine parameter values needed to switch to λ=1 operation, and during λ=1 operation, the processor calculates the engine parameter values needed to switch to lean mode operation where λ is a ratio of actual air fuel ratio to stoichiometric air fuel ratio.

51. The cross platform kit of claim 50 further comprising an electric accelerator pedal.

52. The cross platform kit of claim 50 where the air pump is a turbo charger.

53. The cross platform kit of claim 50 where the air pump is a VTG turbo charger.

54. The cross platform kit of claim 50 where the air pump is a super VTG turbo charger.

55. The cross platform kit of claim 50 further comprising a supercharger.

56. The cross platform kit of claim 50 where the fuel intake assembly comprises an intake manifold with predrilled holes for mounting processor controllable fuel injectors, processor controllable fuel injectors for the primary fuel, processor controllable fuel injectors for the secondary fuel and a processor controllable throttle.

57. A device for controlling a bi-fuel naturally aspirated engine, the device comprising:

a processor coupled to the engine; and an air pump coupled to the engine and processor and said air pump is controlled by the processor to provide air to the engine where to meet engine power requirements, the processor calculates acceptable λ values based on measured engine parameter values, and operates the engine at one of first, second and third acceptable λ values avoiding forbidden λ values, the processor operating the engine in a first lean mode using a primary fuel at a first acceptable λ value;

the processor operating the engine in a second lean mode using a mixture of the primary fuel and a secondary fuel at a second acceptable λ value;

the processor operating the engine in a λ=1 mode using a mixture of the primary and secondary fuels;

where, in anticipation of changing engine power requirements, during lean mode operation, the processor calculates engine parameter values needed to switch to λ=1 operation, and during λ=1 operation, the processor calculates the engine parameter values needed to switch to lean mode operation where λ is a ratio of actual air fuel ratio to stoichiometric air fuel ratio.

58. The device of claim 57 where the fuel intake assembly comprises fuel injectors for the primary fuel and fuel injectors for the secondary fuel where said injectors are used to inject the respective fuels into a combustion chamber of the engine through an inlet valve of the combustion chamber.

59. The device of claim 58 where the engine is operated with the primary fuel and said fuel is injected such that the primary fuel air mixture enters the combustion chamber before the inlet valve closes and air is placed within the combustion chamber in front of the closed inlet valve.

60. The device of claim 59 where the primary fuel is hydrogen.

* * * * *